(12) United States Patent
Strankman

(10) Patent No.: US 12,553,323 B2
(45) Date of Patent: Feb. 17, 2026

(54) FRACING SYSTEM WITH THREADED BLOCK CONNECTOR AND VARIABLE LENGTH CONNECTOR

(71) Applicant: Edge Mechanical Design Inc., Red Deer (CA)

(72) Inventor: Daine Strankman, Red Deer (CA)

( * ) Notice: Subject to any disclaimer, the term of this patent is extended or adjusted under 35 U.S.C. 154(b) by 49 days.

(21) Appl. No.: 18/523,835

(22) Filed: Nov. 29, 2023

(65) Prior Publication Data

US 2024/0175341 A1 May 30, 2024

Related U.S. Application Data

(60) Provisional application No. 63/428,726, filed on Nov. 29, 2022.

(51) Int. Cl.
| | | |
|---|---|---|
| *E21B 17/08* | (2006.01) | |
| *E21B 17/10* | (2006.01) | |
| *E21B 43/26* | (2006.01) | |
| *F16L 15/00* | (2006.01) | |

(52) U.S. Cl.
CPC .............. *E21B 43/26* (2013.01); *E21B 17/08* (2013.01); *F16L 15/006* (2013.01); *E21B 2200/01* (2020.05)

(58) Field of Classification Search
CPC ............. E21B 17/1007; E21B 43/2607; E21B 2200/01; E21B 17/08; E21B 17/10; E21B 43/26; F16L 15/006; F16L 57/06
See application file for complete search history.

(56) References Cited

U.S. PATENT DOCUMENTS

| | | | | |
|---|---|---|---|---|
| 7,789,133 | B2 * | 9/2010 | McGuire | E21B 43/2607 166/177.5 |
| 8,931,551 | B2 * | 1/2015 | McGuire | E21B 43/26 166/177.5 |
| 9,506,310 | B2 * | 11/2016 | Hopper | E21B 33/03 |
| 10,323,475 | B2 * | 6/2019 | Christopherson | F16L 55/00 |
| 10,538,973 | B2 * | 1/2020 | Hill | B65D 19/0004 |
| 11,428,070 | B2 * | 8/2022 | Webster | E21B 17/05 |
| 2007/0251578 | A1 * | 11/2007 | McGuire | F16L 37/088 137/375 |
| 2017/0370172 | A1 * | 12/2017 | Tran | F04B 47/00 |
| 2020/0393088 | A1 * | 12/2020 | Sizemore | E21B 43/2607 |
| 2021/0355937 | A1 * | 11/2021 | Rodriguez | F04B 53/16 |

* cited by examiner

*Primary Examiner* — Matthew R Buck
(74) *Attorney, Agent, or Firm* — Sander R Geising

(57) ABSTRACT

In one aspect there is provided a block connector comprising a block member having at least one block port and at least one connection sub. The connection sub has a pipe connection end and a block connection end. The block connection end is threadably connectable to the bore port. In another embodiment of the invention there is provided a block connector comprising a block member having a plurality of block ports and at least one block bore. A plurality of wear sleeves are positionable within the at least one block bore, and said wear sleeves are secured within said at least one block bore.

4 Claims, 25 Drawing Sheets

FRACING SYSTEM WITH THREADED BLOCK CONNECTOR AND VARIABLE LENGTH CONNECTOR

CROSS REFERENCE TO RELATED APPLICATION

This application is a non-provisional application which claims priority to, and benefit of, U.S. Provisional Patent Application Ser. No. 63/428,726 filed Nov. 29, 2022 and entitled, "FRACING SYSTEM WITH THREADED BLOCK CONNECTOR AND VARIABLE LENGTH CONNECTOR", the entirety of which is incorporated herein by reference.

FIELD OF THE INVENTION

This invention relates generally to well fracturing systems used in oil and gas exploration and production operations and, in particular, to a well fracturing system that is axially, variably adjustable, has a reduced need for conventional studded connections, and has improved wear resistance.

BACKGROUND OF THE INVENTION

The background information discussed below is presented to better illustrate the novelty and usefulness of the present invention. This background information is not admitted prior art.

Oil and gas exploration requires complex industrial equipment to be interconnected at a well site in a precise manner. Typically, a drilling rig and wellhead is connected to a pump of some type to drive drilling operations. A particular site may have numerous wells that are drilled. To improve subsequent production at these sites, fracturing fluids may be pumped down these wells to fracture subterranean rock layers and thereby free oil and natural gas. This process is commonly referred to as hydraulic fracturing or fracing. Hydraulic fracturing produces fractures in the rock formation that stimulate the flow of natural gas or oil, increasing the volumes that can be recovered from a well.

Fractures are created by pumping large quantities of fracturing fluids at high pressure down a well and into the target rock formation. The fracturing fluid creates pressure within the well as the fluid accumulates, until the pressure causes cracks to form in the earth, or causes existing cracks in the earth to widen, thereby increasing the flow of hydrocarbons from the well. A proppant is often added to the fracturing fluid to keep an induced hydraulic fracture open. A proppant is a solid material, typically sand, treated sand or man-made ceramic materials, designed to keep an induced hydraulic fracture open, during or following a fracturing treatment. Chemical additives that also assist in opening and enlarging fractures within the rock formation may also be added to the fracturing fluid.

Hydraulic fracturing requires specialized equipment to pump fracturing fluids and any proppants, at varying pressures, to the wells via wellheads. This is conventionally done by a pump supplying fracturing fluids and any proppants to the wellhead for selective delivery down the well. These fracturing fluids are conveyed from pumps to wellheads using interconnected mechanical networks of piping, commonly referred to as fracturing fluid conduits, which typically include one or more fracturing manifolds; e.g. a pumping manifold, a flowback manifold, a choke manifold, and other manifolds. In essence, the fracturing fluid conduits must provide flow paths for varying degrees of pressurized fracturing fluids and/or varying degrees and types of proppants.

The wellheads may each use a fracturing tree and other components to facilitate a fracturing process and enhance production from a well. A fracturing flow control unit may provide control of fracturing fluid flow from the fracturing fluid conduits into one or more fracturing trees positioned on their respective wellheads. The fracturing flow control unit may contain one or multiple valves that controls the flow of the fracturing fluid into the fracturing tree. The fracturing flow control units and fracturing trees are typically large and heavy, and may be mounted together at a fixed location, thereby making adjustments in the fracturing manifold connected between the fracturing flow control units difficult.

Additionally, the various manifolds must be installed at the wellhead surface, which can require six to eight hours, or longer, and numerous personnel. Connections between the various components of a fracturing fluid conduit are typically made via a flanged and/or studded connection, each of which typically has between 8 to 16 sets of nuts, studs, bolts and washers which require proper fastening and torquing to the required specification; see, for example, the studded and flanged connection system taught in U.S. Pat. No. 8,839,867.

Moreover, in wellsite having multiple wellheads, manifolds and fracturing trees, connection alignment issues often occur. U.S. Pat. No. 8,839,867 also discloses a fracturing fluid conduit where the conduit length is axially adjusted by an adjustment joint with a plurality of components using threaded parts, studs and nuts, and special sealing members to achieve a seal after the conduit adjustments are made. While this axially adjusted feature aids with overcoming alignment issues, it can still take a number of days to assemble the full fracturing fluid conduit system, especially in wellsite with multiple wellheads.

Another problem with existing well fracturing systems is that they tend to utilize block connectors, or blocks, to provide fluid communication between the various fracturing fluid conduit components, including any fracturing fluid flow control units on fracturing trees. These blocks may have two, three, four or more connections, and they may be arranged in a conventional manner to diverge or converge fracturing fluids when such fluids are directed to/from the wellheads. However, if the fracturing fluids contain proppant or chemical additives, the internal fluid paths of these blocks is subject to significantly increased wear and damage; especially when the blocks are configured to change direction of the fracturing fluid (e.g. a 90 degree turn in the fluid path, or a three-way block that diverges a single incoming hydraulic fluid path into two outgoing fluid paths).

Therefore, what is needed is a fracturing fluid conduit system that does not suffer from these disadvantages.

SUMMARY OF THE INVENTION

In an embodiment of the invention there is provided a block connector comprising a block member having at least one block port and at least one connection sub. The connection sub has a pipe connection end and a block connection end. The block connection end is threadably connectable to the bore port.

In another embodiment of the invention there is provided a block connector comprising a block member having a plurality of block ports and at least one block bore. A plurality of wear sleeves are positionable within the at least one block bore, and said wear sleeves are secured within said at least one block bore.

In yet another embodiment of the invention there is provide a block connector comprising a block member having at least one block port and at least one connection sub having a pipe connection end. The pipe connection end has a threaded section for threadably connecting to pipes or other fracturing fluid conduits.

BRIEF DESCRIPTION OF THE DRAWINGS

Referring to the drawings, several aspects of the present invention are illustrated by way of example, and not by way of limitation, in detail in the figures, wherein.

DETAILED DESCRIPTION OF THE PREFERRED EMBODIMENTS

Figure 1A:
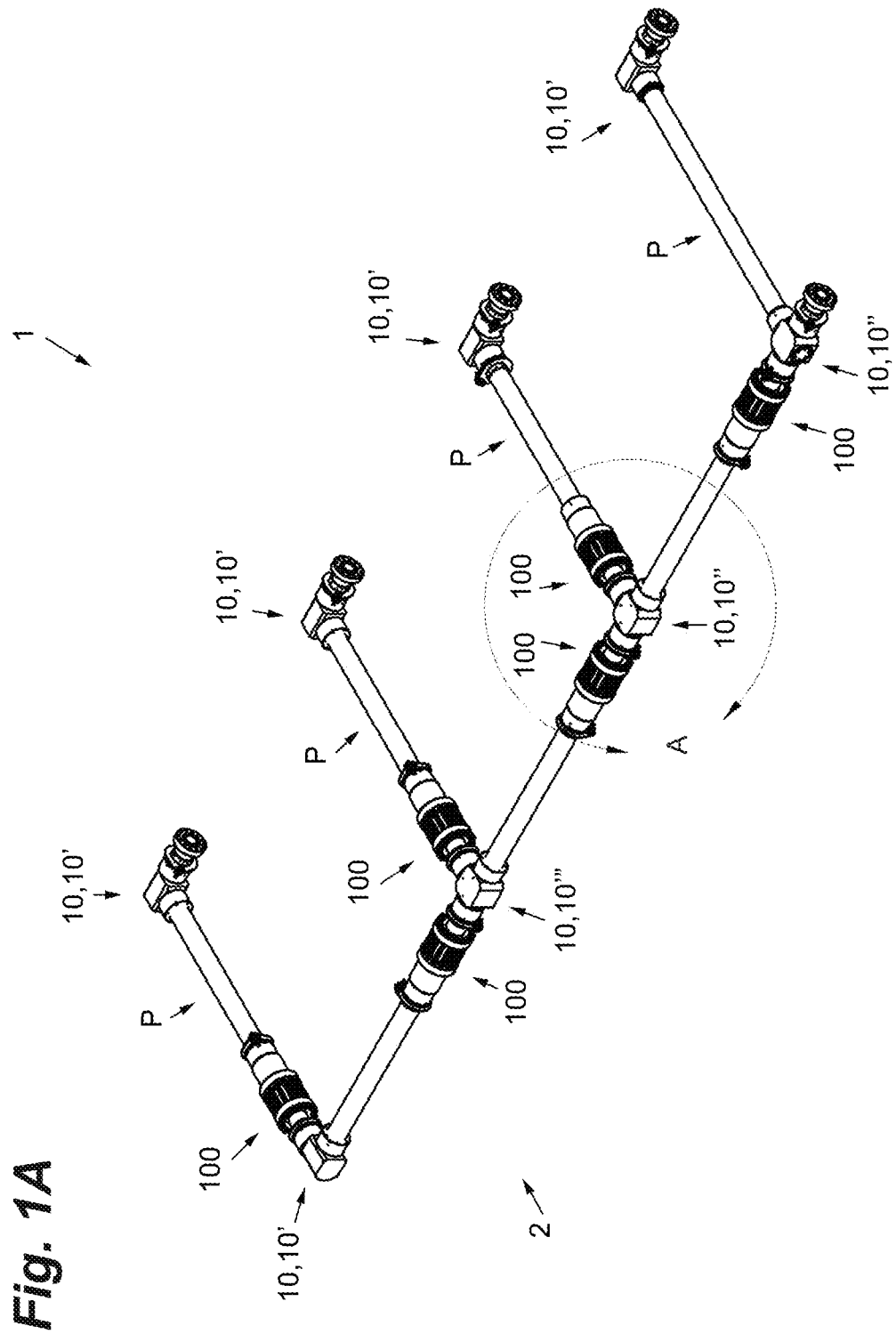
FIG. 1A is a top perspective view of a fracing system with threaded block connector and variable connector in accordance with one embodiment of the present invention.
Figure 1B:
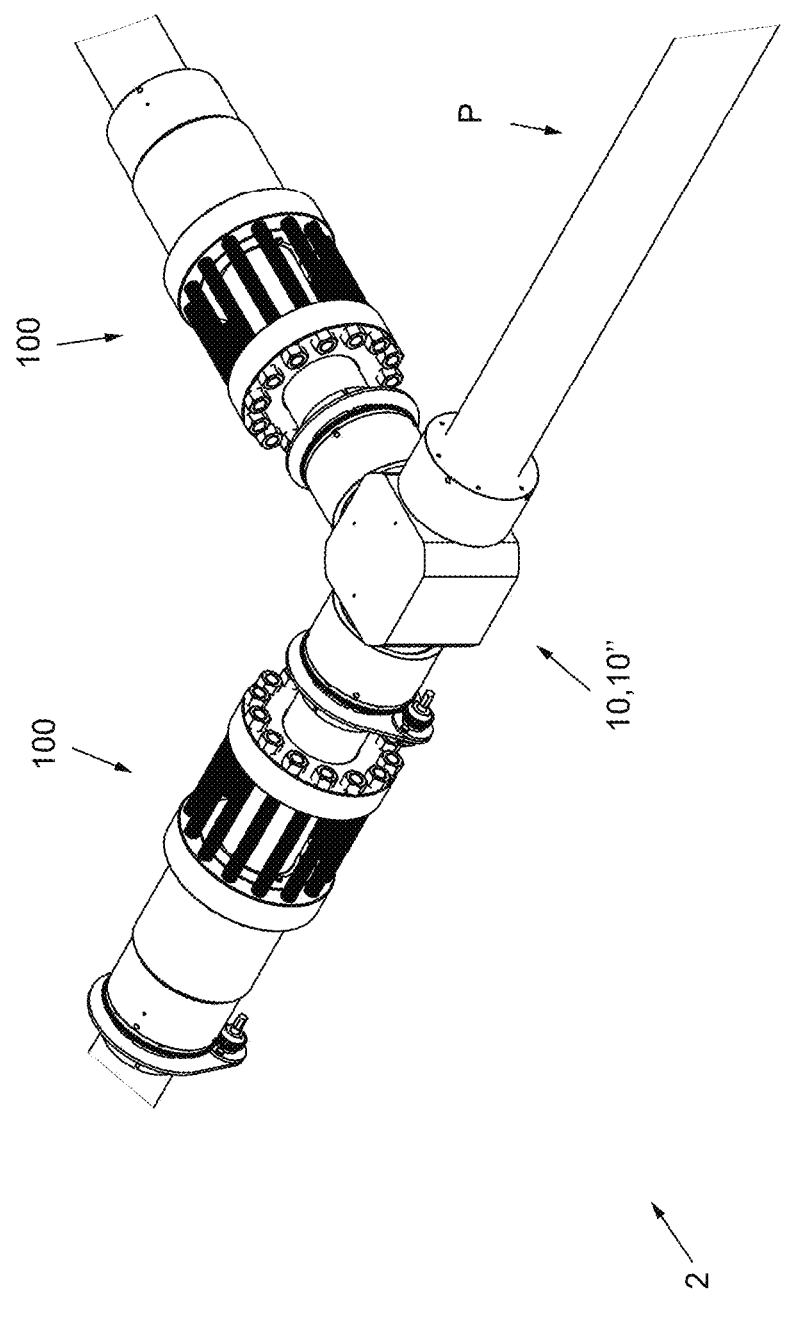
FIG. 1B shows an enlarged view of the encircled portion labelled A shown in FIG. 1A.
Figure 2A:
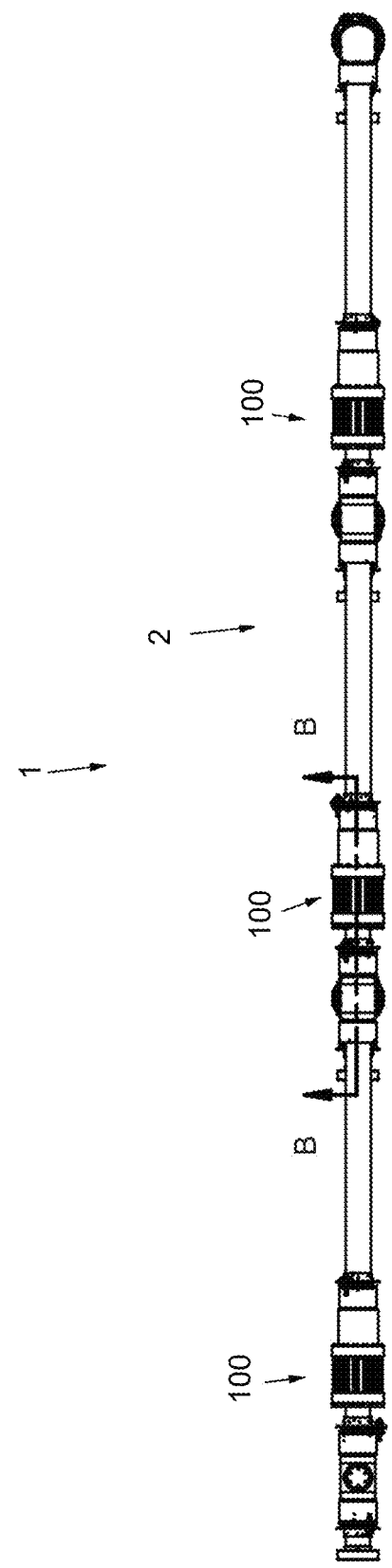
FIG. 2A is a side view of the fracing system with threaded block connector and variable connector of the embodiment of FIG. 1A.
Figure 2B:
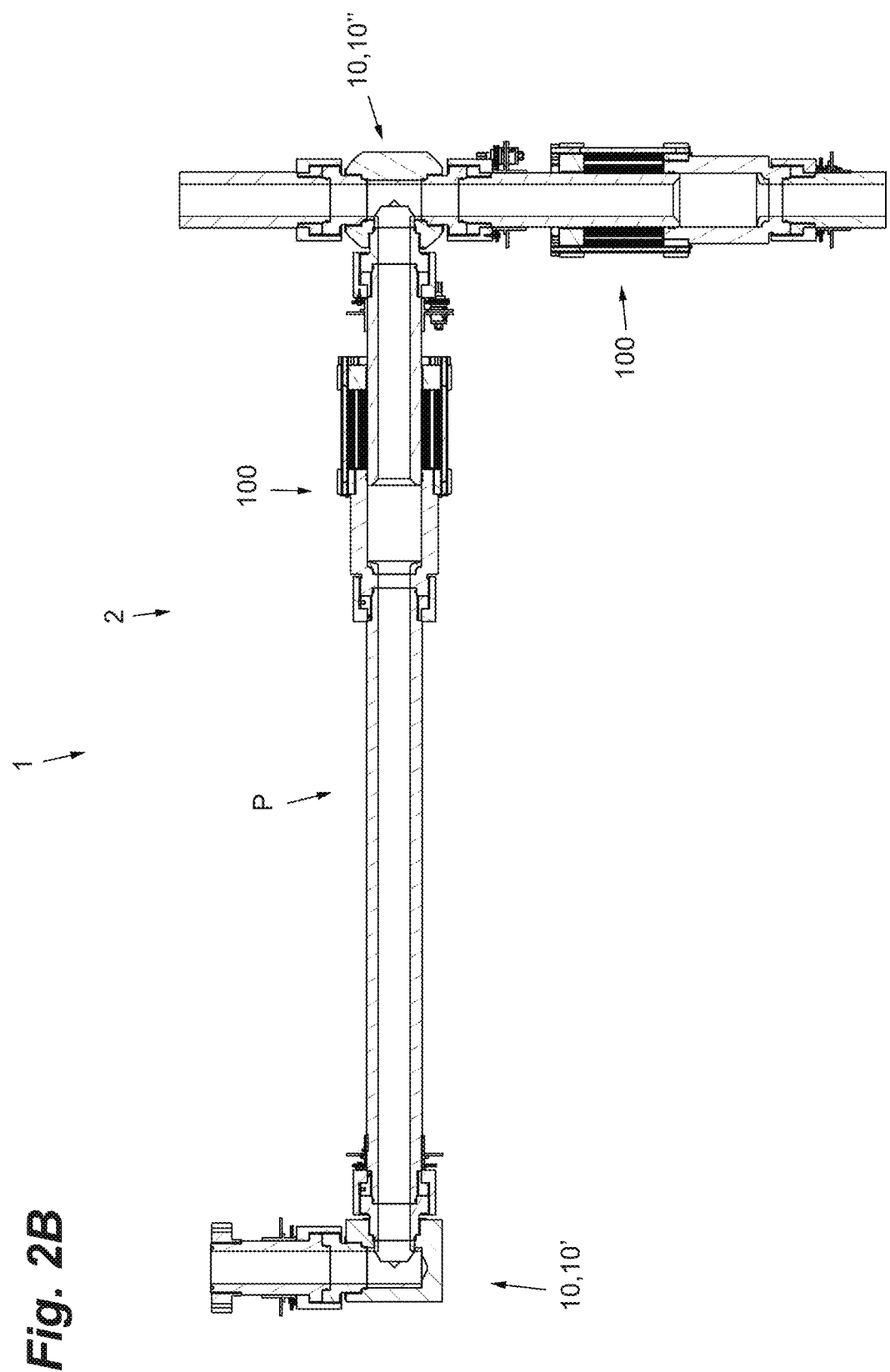
FIG. 2B is a cross-sectional view of the fracing system with threaded block connector and variable connector taken along the line B-B of FIG. 2A.
Figure 3:
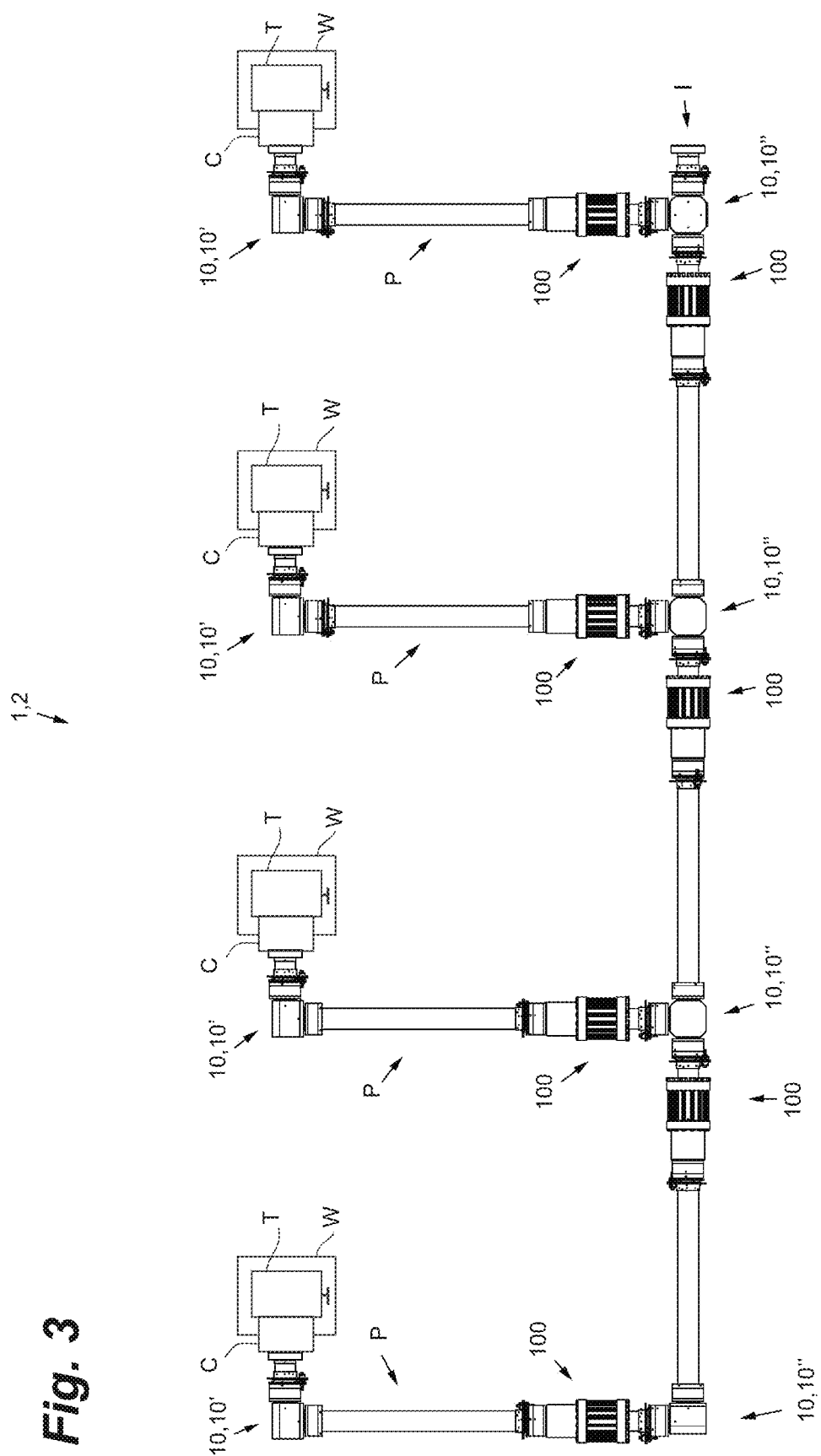
FIG. 3 is a top view of the fracing system with threaded block connector and variable connector of the embodiment of FIG. 1A adjacent a well, tree and control unit.

The following description is of preferred embodiments by way of example only and without limitation to the combination of features necessary for carrying the invention into effect. Reference is to be had to the Figures in which identical reference numbers identify similar components. The drawing figures are not necessarily to scale and certain features are shown in schematic or diagrammatic form in the interest of clarity and conciseness.

Additionally, to assist in the description of the invention, words such as top, bottom, upper, lower, above, below, front, rear, right and left are used to describe the accompanying figures. It will be appreciated, however, that the present invention can be located and positioned in a variety of desired positions and angles, and that the various components can be arranged in other suitable configurations. The terms "comprising," "comprises," "including," "includes," "having," "haves," and their grammatical equivalents are used herein to mean that other components, elements or steps are optionally present.

A first embodiment of a fracing system 1 with threaded block connector 10 and variable connector 100 of the present invention is shown in FIGS. 1A-3. Various components of the fracing system 1 with threaded block connector 10 and variable connector 100 are shown in FIGS. 4A-7C.

The fracing system 1 comprises a fracturing fluid conduit 2, at least one threaded block connector 10 and at least one variable connector 100. The fracturing fluid conduit 2, along with the threaded block connectors 10 and variable connectors 100, provides flow paths for varying degrees of pressurized fracturing fluids and/or varying degrees and types of proppants from a source of pressurized fluid (not shown), through to one or more wellheads W. The source of pressurized fluid (not shown) is preferably connected to an inlet I of the fracturing fluid conduit 2 in a conventional manner. The fracturing fluid conduit 2 may comprise sections of tubular conduits, such as pipes P that are threadably connected between the threaded block connectors 10 and variable connectors 100.

Figure 8A:
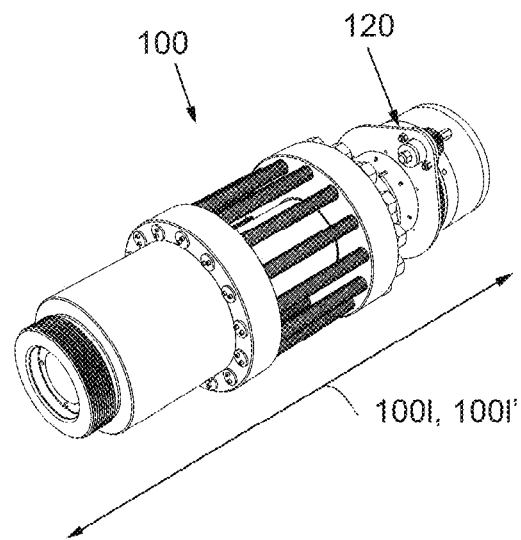
FIGS. 8A-8C are perspective views of the variable length connector of the embodiment of FIG. 7A shown actuated between extended (FIG. 8A) and contracted (FIG. 8C) positions.
Figure 8B:
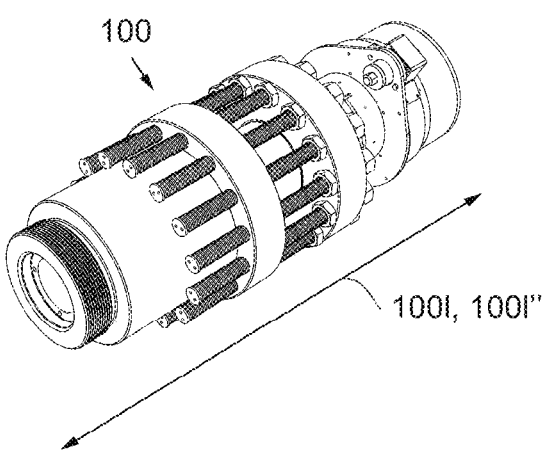
Figure 8C:
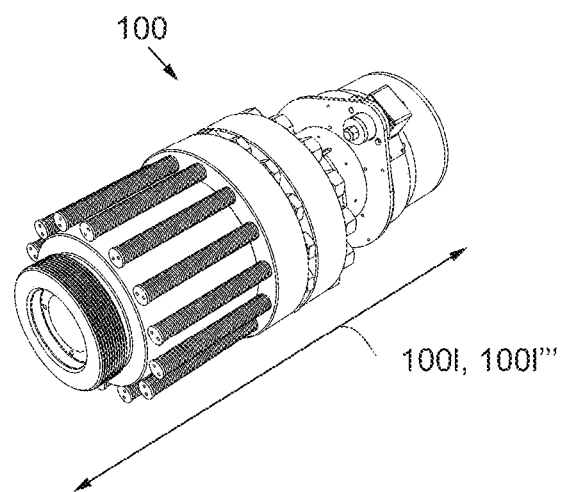
Figure 8D:
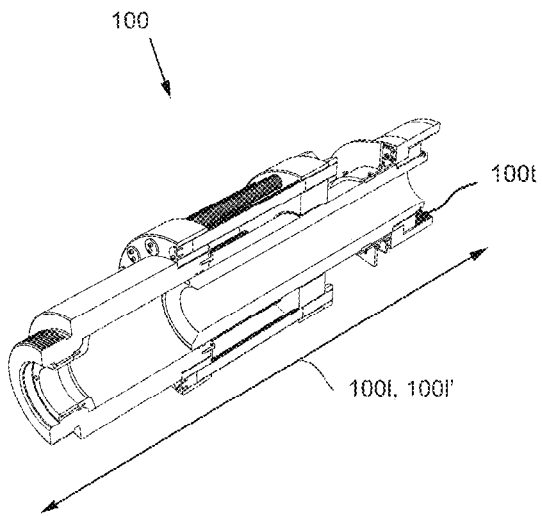
FIGS. 8D-8F are sectioned, perspective views of the variable length connector of the embodiment of FIG. 7A shown actuated between extended (FIG. 8D) and contracted (FIG. 8F) positions.
Figure 8E:
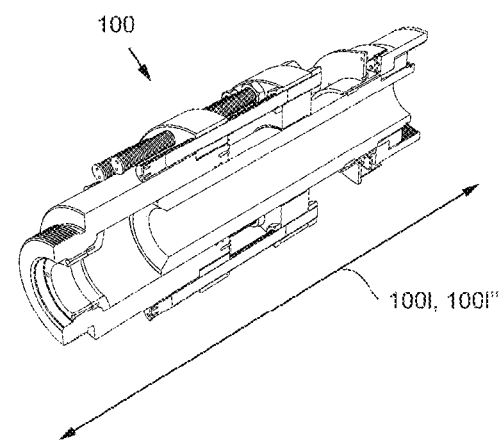
Figure 8F:
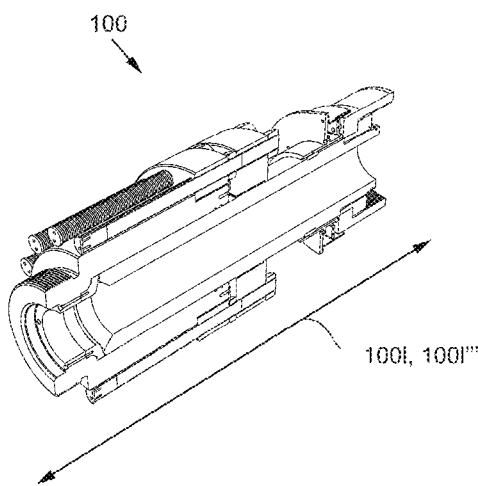

Variable connectors 100 preferably telescope or adjust along a longitudinal axis 1001 between an extended position (see FIG. 8A) having a first length 100*l'*, a middle position (see FIG. 8B) having a second length 100*l''* and a contracted position (see FIG. 8C) having a third length 100*l'''*. As can be seen, first length 100*l'* is longer than second length 1001'', and second length 100*l''* in turn is longer than third length 100*l'''*. The variable connector 100 can actuate between extended position and contracted position, by means of actuator 120 (such as a rotary actuator), and thereby adjust to various lengths as may be desired between first length 100*l'* and third length 1001''.

The wellheads W may each use a fracturing tree T and other components to facilitate a fracturing process and enhance production from a well. A fracturing flow control unit C may provide control of fracturing fluid flow from the fracturing fluid conduit 2 into one or more fracturing trees T positioned on their respective wellheads W.

Figure 6A:
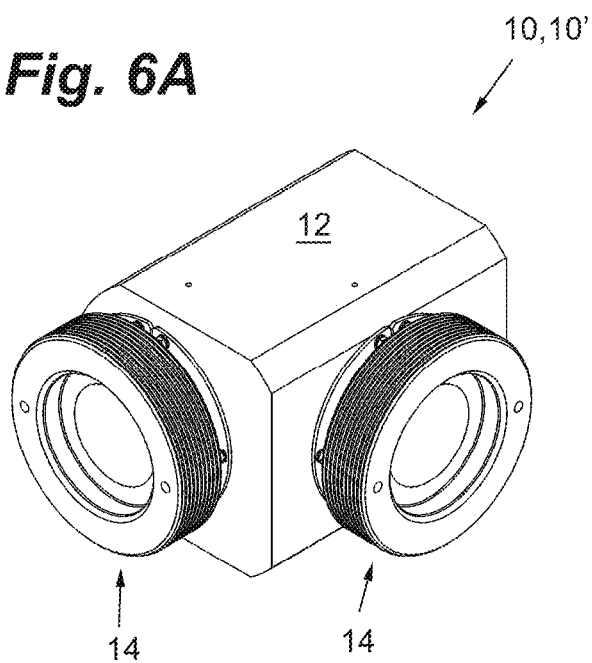
FIG. 6A is a top perspective view of yet another preferred embodiment of a threaded block connector.
Figure 6B:
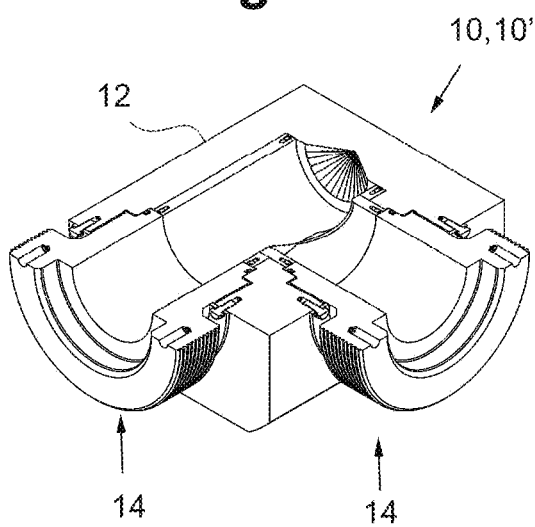
FIG. 6B is a front view of the threaded block connector of the embodiment of FIG. 6A.
Figure 6C:
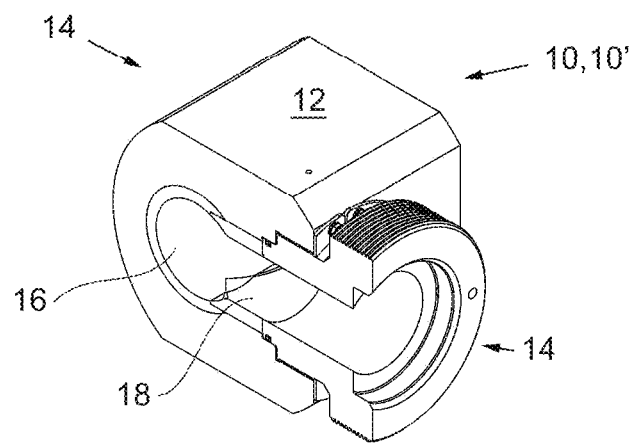
FIG. 6C is a cross-sectional view of the threaded block connector taken along the line D-D of FIG. 6B.
Figure 7A:
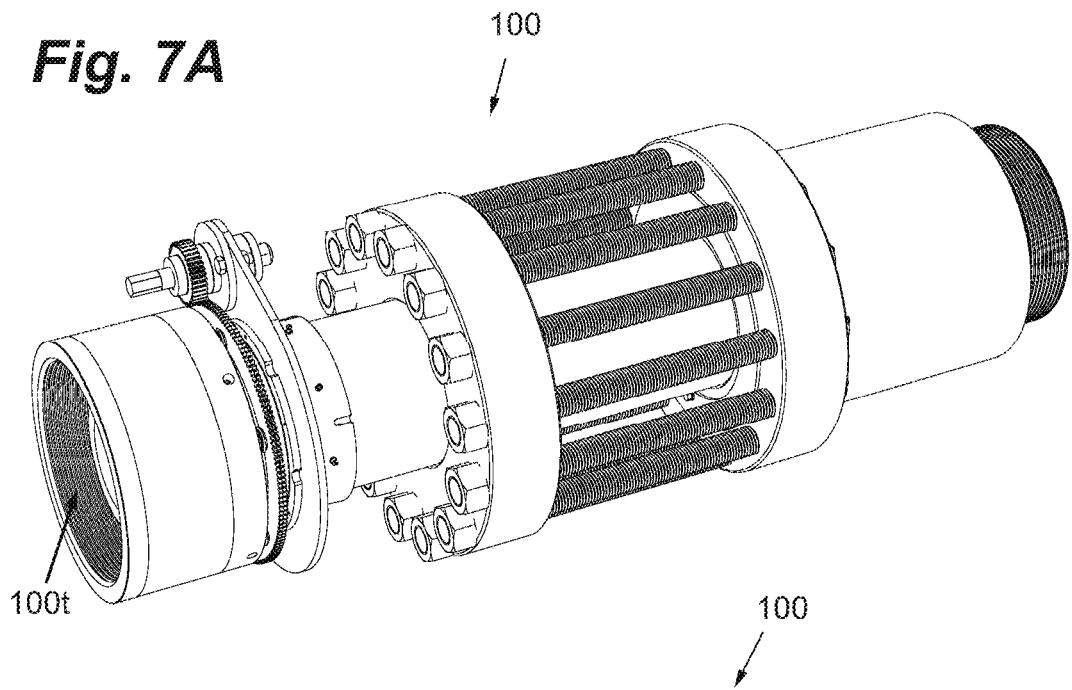
FIG. 7A is a perspective view of a preferred embodiment of variable length connector.
Figure 7B:
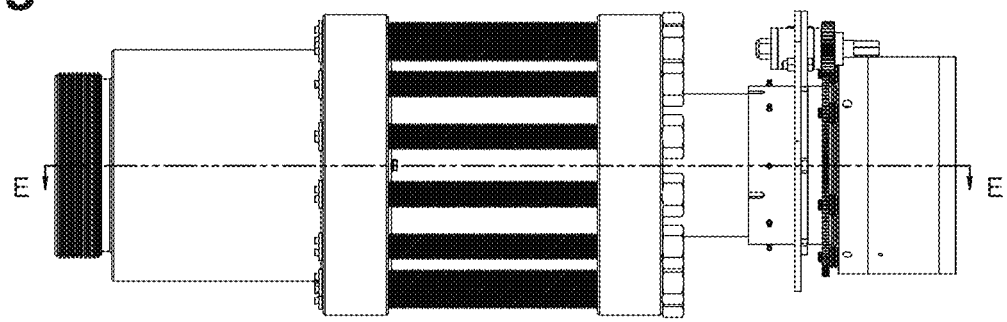
FIG. 7B is a side view of the variable length connector of the embodiment of FIG. 7A.
Figure 7C:
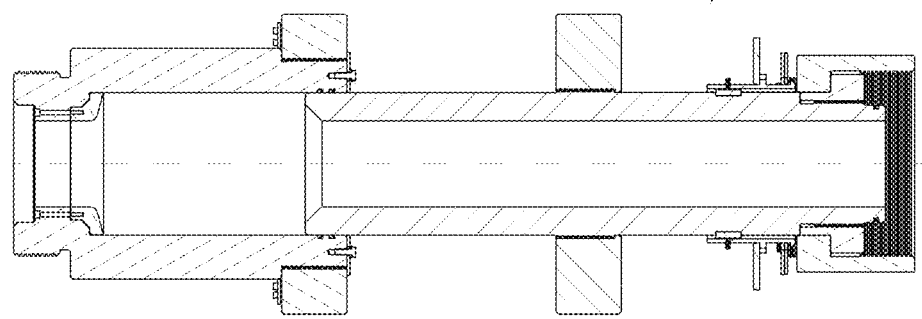
FIG. 7C is a cross-sectional view of the threaded block connector taken along the line E-E of FIG. 6B.

The threaded block connectors or blocks 10 can be understood with reference to FIGS. 4A-6C. A preferred embodiment of a three-way block connecter 10'' is shown in FIGS. 4A-4M. A preferred embodiment of a four-way block connecter 10''' is shown in FIGS. 5A-5C. A preferred embodiment of a two-way block connecter 10' is shown in FIGS. 6A-6C. Another preferred embodiment of a three-way block connecter 10'' is shown in FIGS. 10A-10H.

Figure 4A:
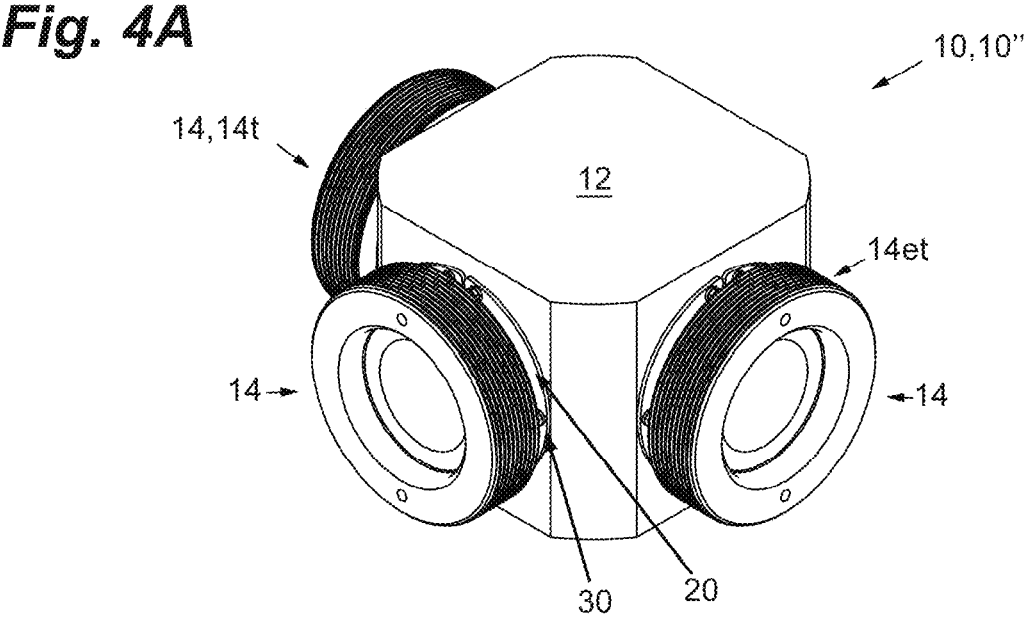
FIG. 4A is a top perspective view of a preferred embodiment of a threaded block connector.
Figure 4B:
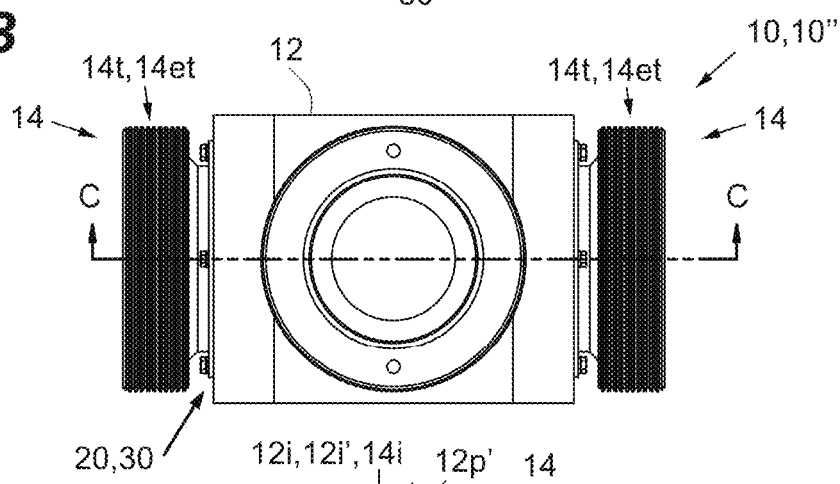
FIG. 4B is a front view of the threaded block connector of the embodiment of FIG. 4A.
Figure 4C:
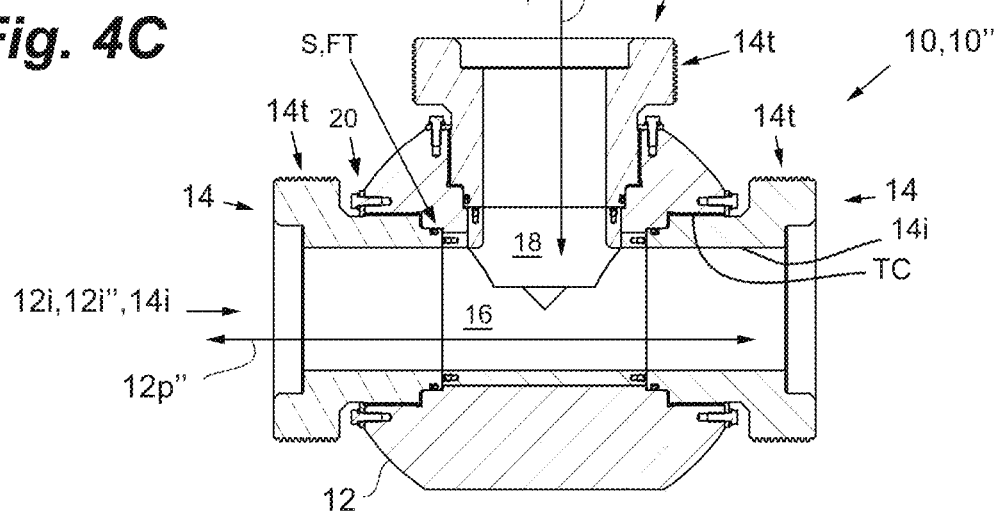
FIG. 4C is a cross-sectional view of the threaded block connector taken along the line C-C of FIG. 4B.
Figure 4D:
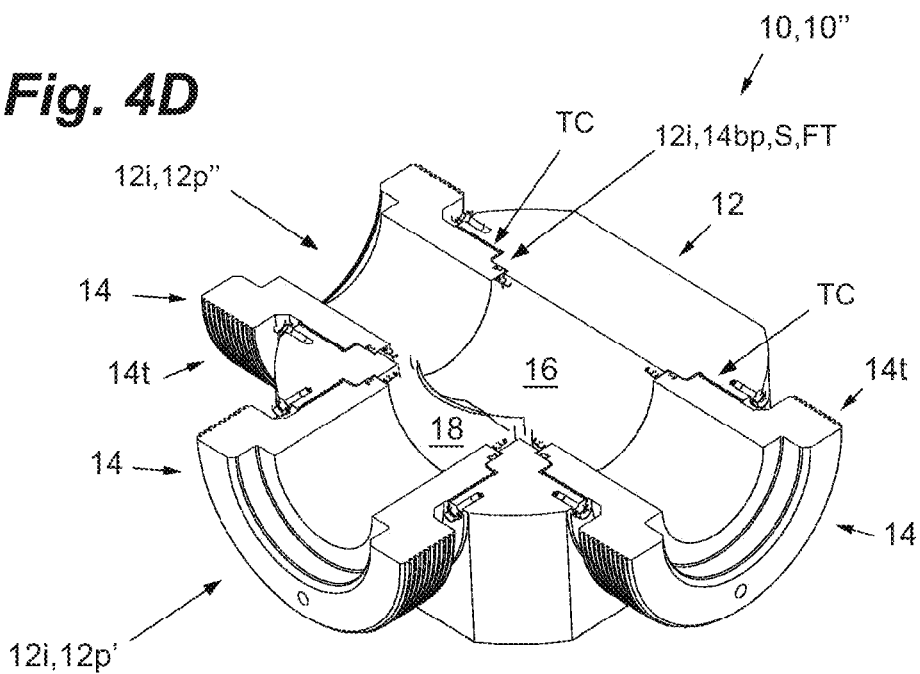
FIG. 4D is a sectioned top perspective view of the threaded block connector of the embodiment of FIG. 4A.
Figure 4E:
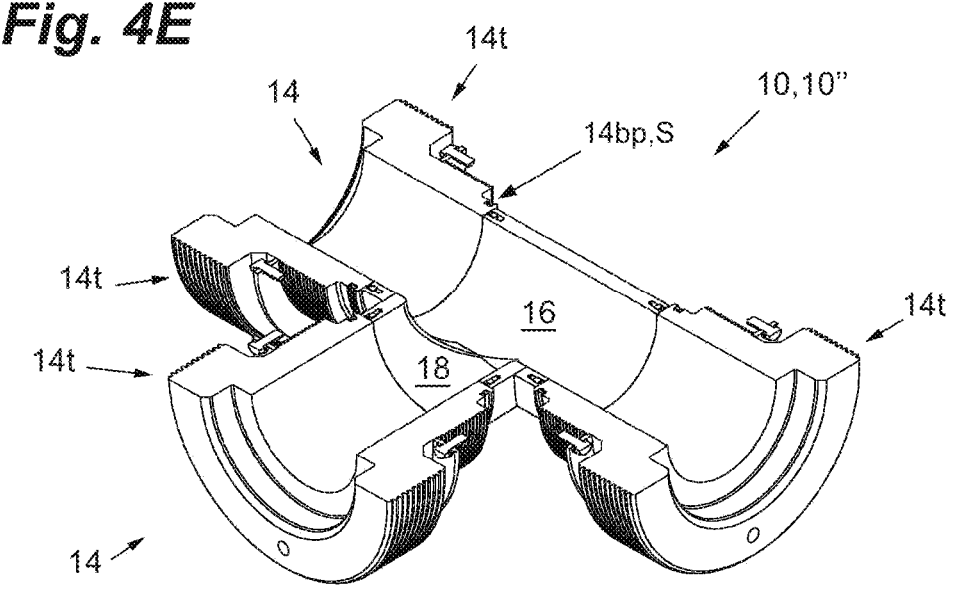
FIGS. 4E-4F are sectioned top perspective views of some of the components of the threaded block connector of the embodiment of FIG. 4A.
Figure 4F:
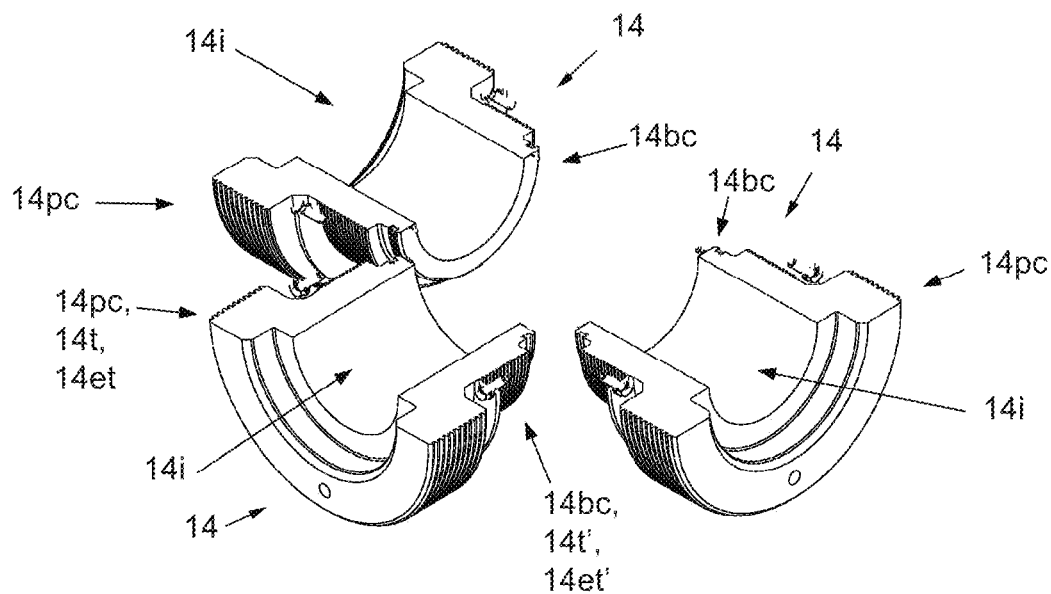

The threaded block connector 10 preferably comprises a base block member 12 and one or more connection subs or unions 14, each sub 14 having a sub bore or internal passage 14*i* to conduct fracing fluids through sub 14 (as is conventional), a conduit or pipe connection end 14*pc* and a block connection end 14*bc* (see FIG. 4F). Pipe connection end 14*pc* preferably comprises an outwardly projecting threaded end or threaded section 14*t* (e.g. as shown in FIGS. 4A-4G), although other conventional pipe connections may be provided at pipe connection end 14*pc* (e.g. see flanged end 14*f* in FIGS. 10A-10F).

Figure 9A:
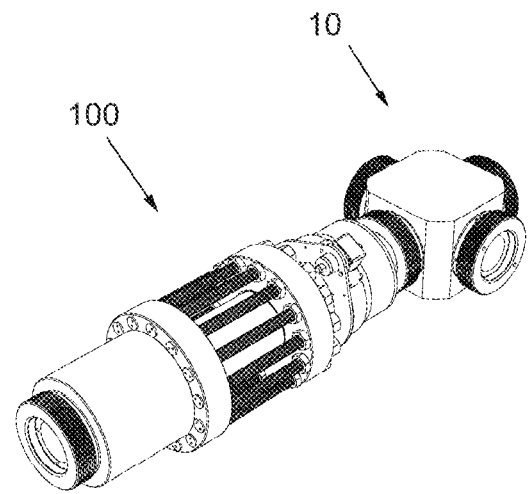
FIG. 9A is a perspective view of a preferred embodiment of a variable length connector positioned adjacent a preferred embodiment of a threaded block connector, ready to make a threaded connection therebetween.
Figure 9B:
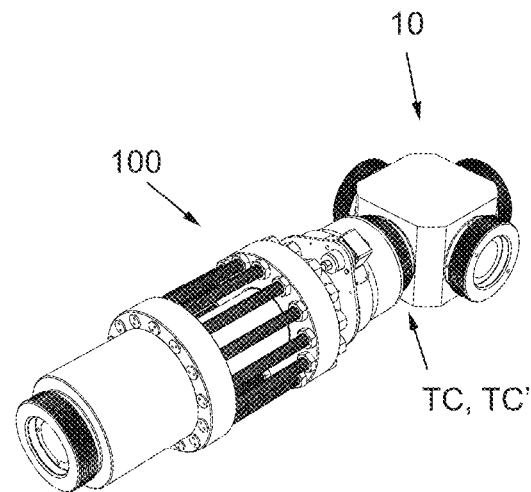
FIG. 9B is a perspective view of the variable length connector of FIG. 9A partially, threadably connected to the threaded block connector of FIG. 9A.
Figure 9C:
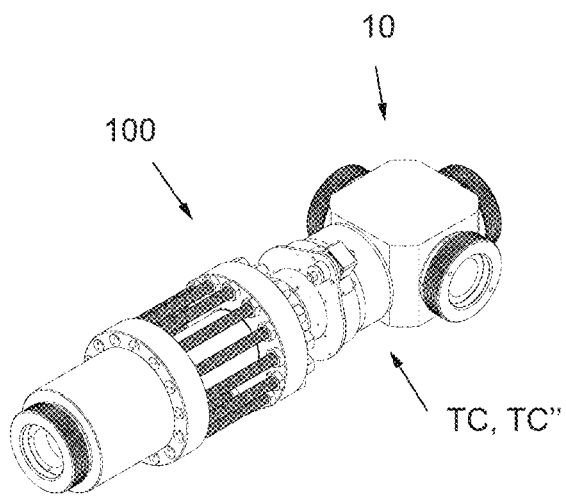
FIG. 9C is a perspective view of the variable length connector of FIG. 9A threadably connected to the threaded block connector of FIG. 9A.
Figure 9D:
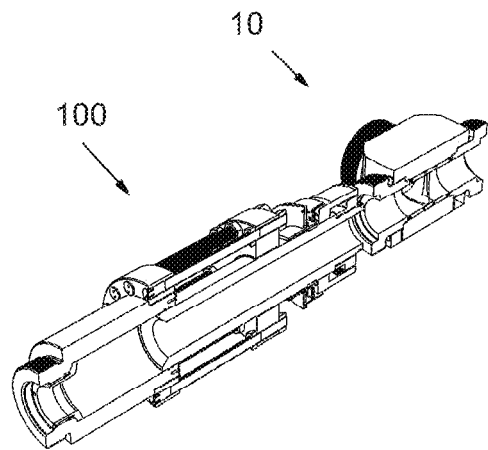
FIGS. 9D-9F are sections perspective views of the variable length connector and threaded block connector of the embodiments of FIGS. 9A-9C respectively.
Figure 9E:
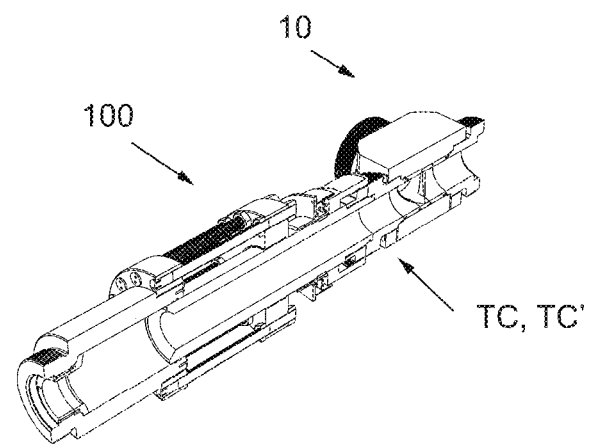
Figure 9F:
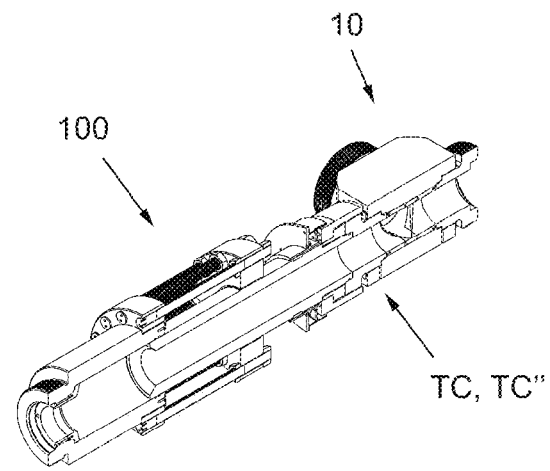
Figure 10A:
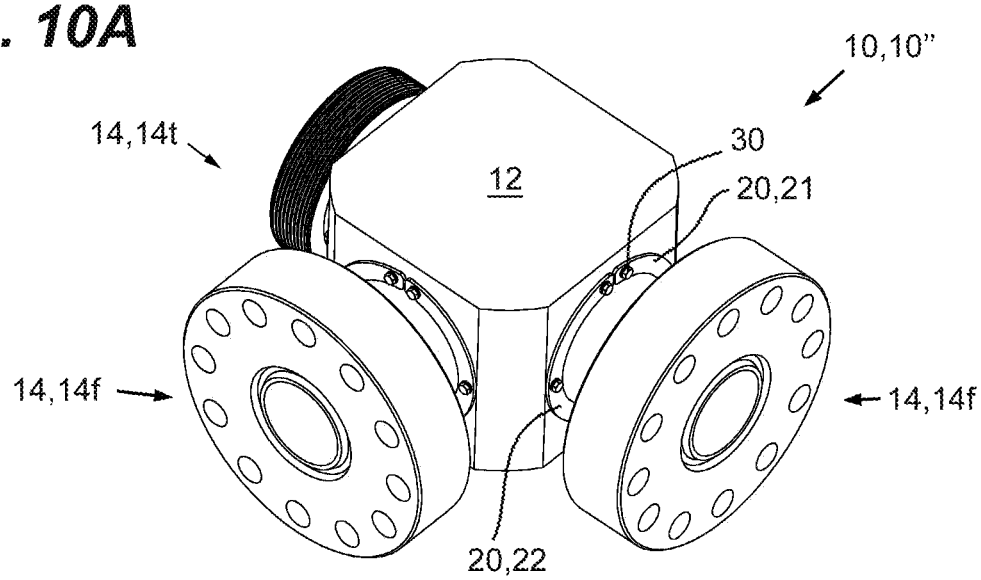
FIG. 10A is a top perspective view of yet another preferred embodiment of a threaded block connector.
Figure 10B:
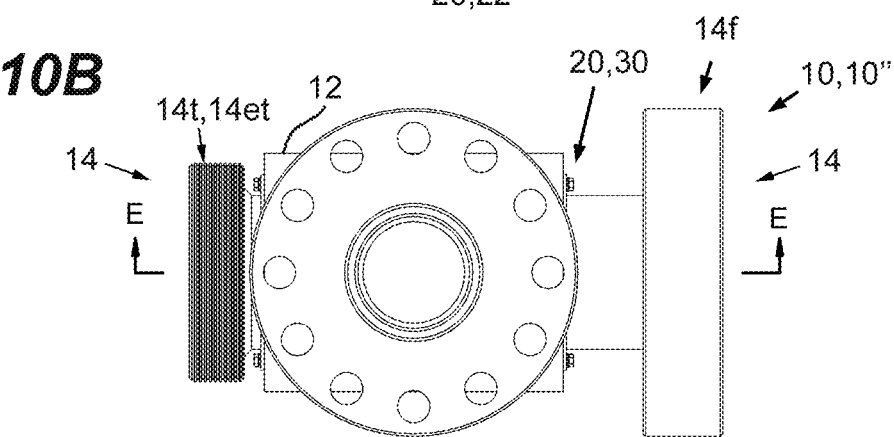
FIG. 10B is a front view of the threaded block connector of the embodiment of FIG. 10A.
Figure 10C:
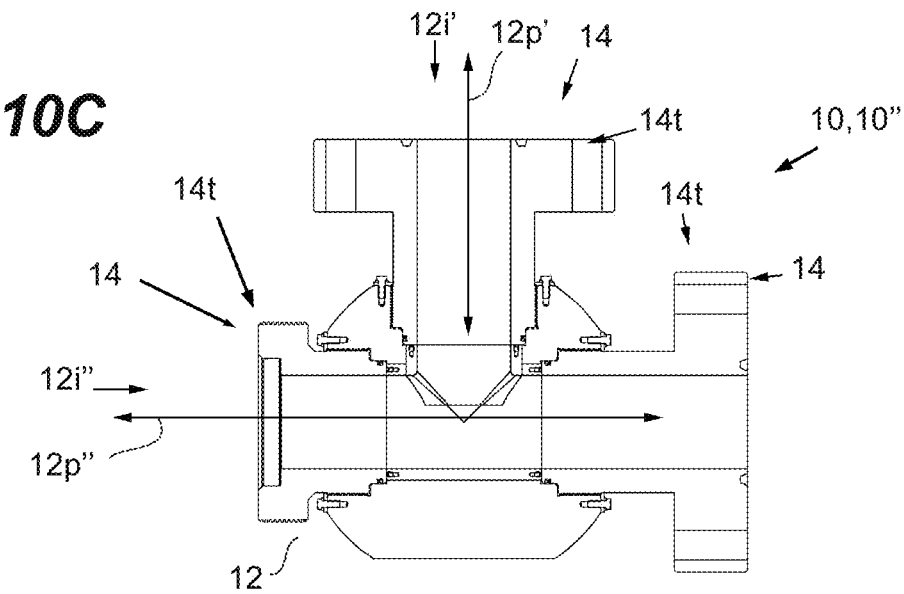
FIG. 10C is a cross-sectional view of the threaded block connector taken along the line F-F of FIG. 10B.
Figure 10D:
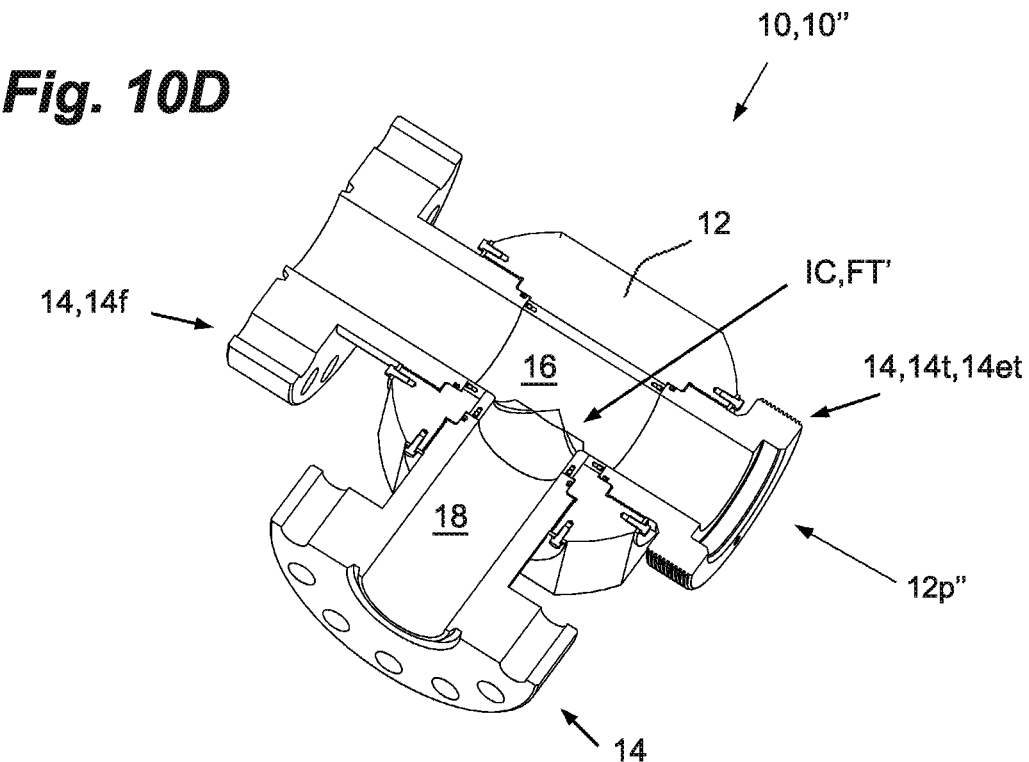
FIG. 10D is a sectioned top perspective view of the threaded block connector of the embodiment of FIG. 10A.
Figure 10E:
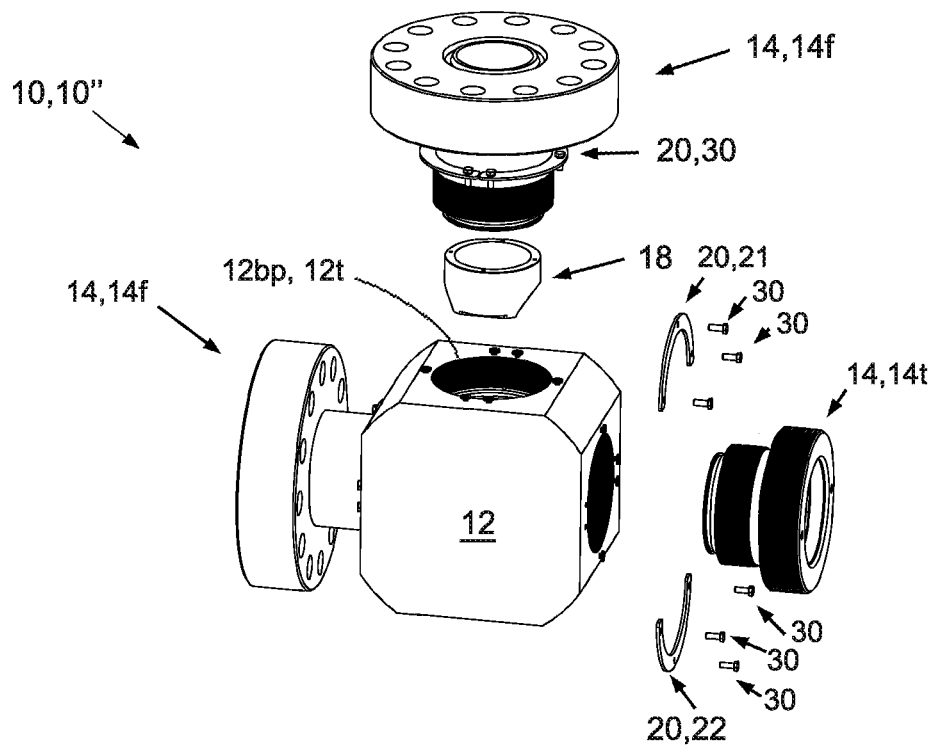
FIGS. 10E-10F are partially exploded perspective and sectioned perspective views, respectively, of the threaded block connector of the embodiment of FIG. 10A.
Figure 10F:
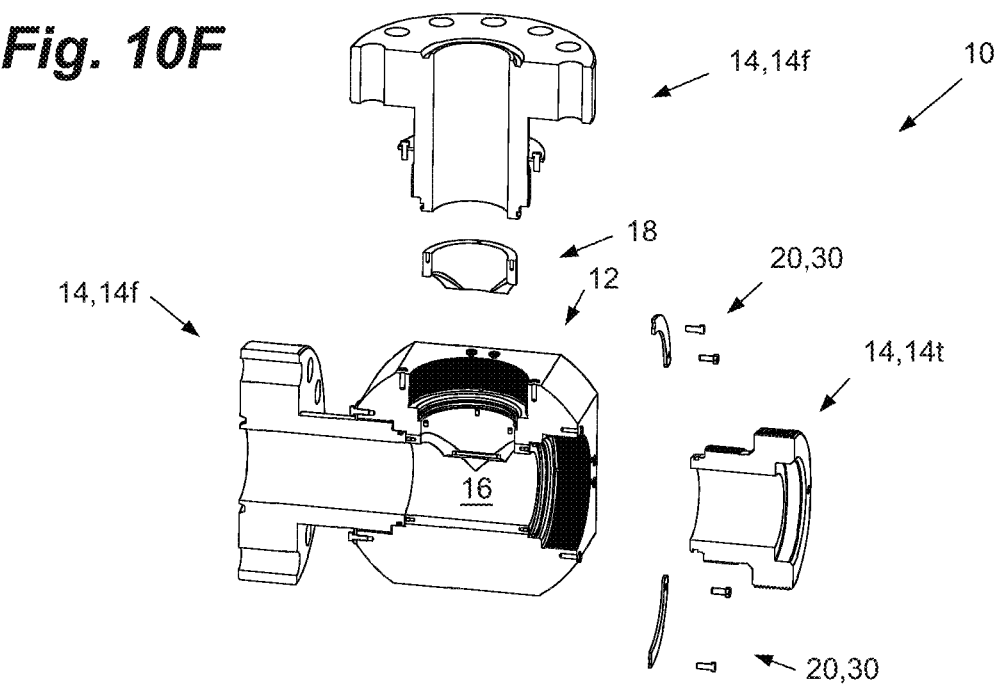
Figure 10G:
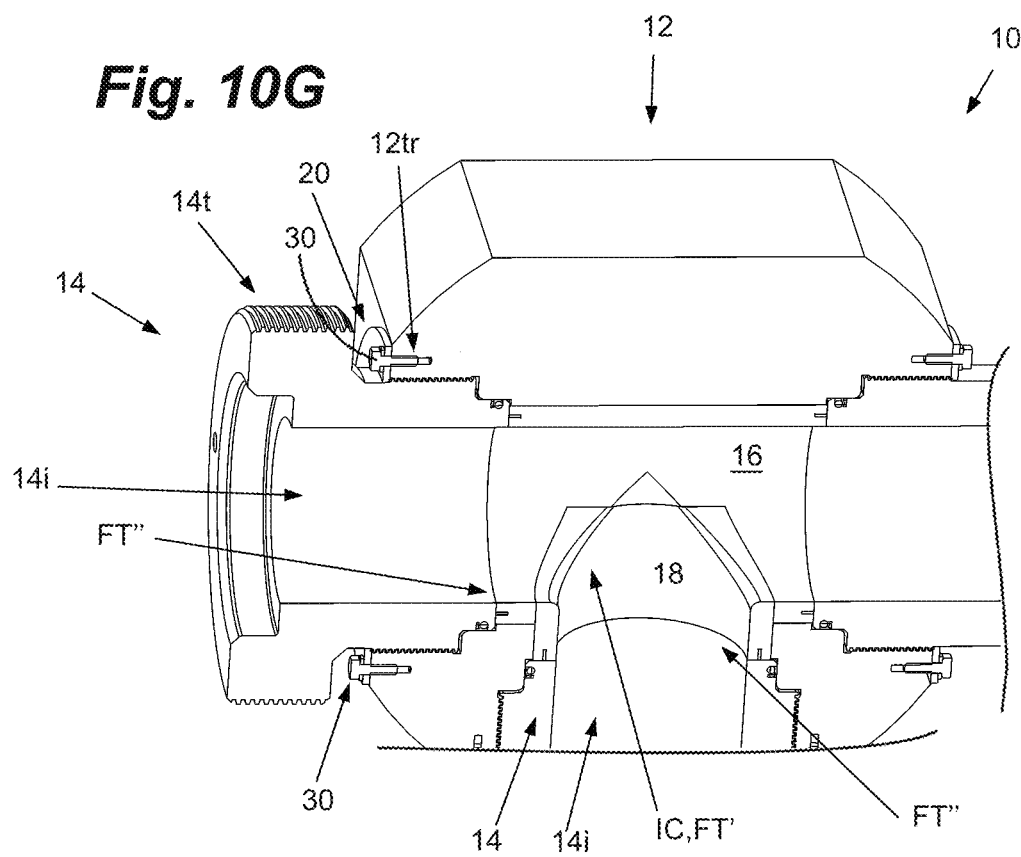
FIGS. 10G-10H are section perspective views of the threaded block connector of the embodiment of FIG. 10A.
Figure 10H:
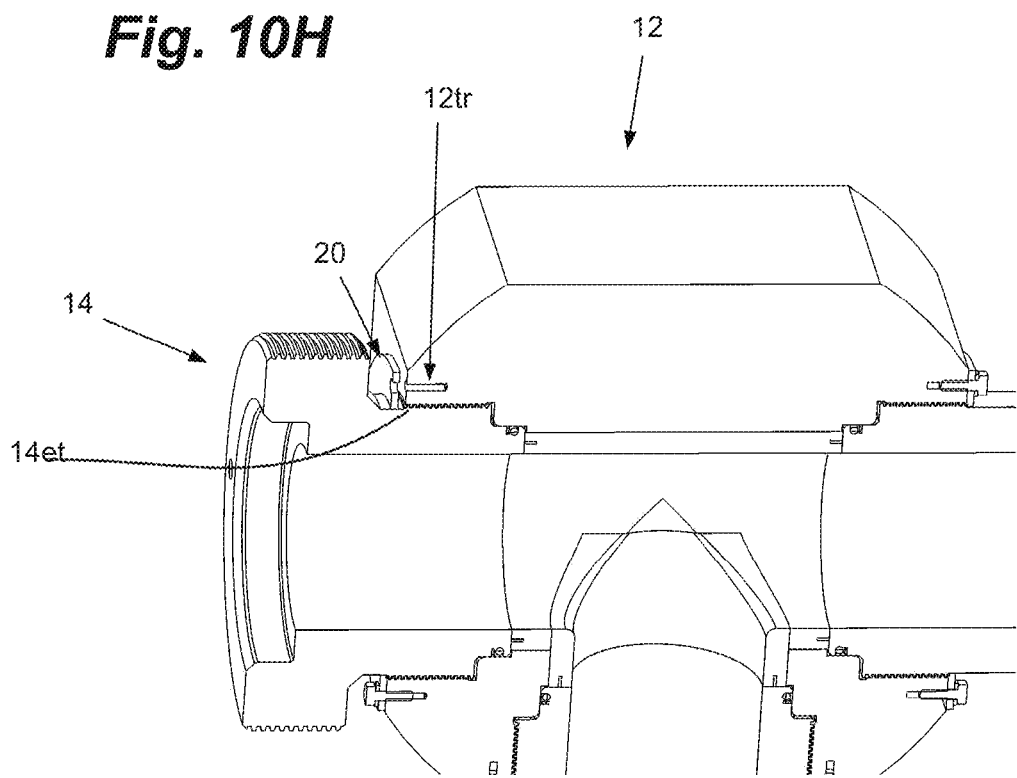

Threaded section 14*t* is preferably externally threaded 14*et* and is connectable to internal threads of tubular conduits or pipes P and/or internal threads 100*t* of the variable connectors 100 (see FIG. 7A) to make a sealed, threaded connection TC between the connection sub 14 and the variable connector 100 and/or the fracturing fluid conduit 2 (e.g. the pipes P). See, for examples FIGS. 9A-9C. FIG. 9A illustrates a variable length connector 100 positioned adjacent a block 10, ready to make a threaded connection therebetween. FIG. 9B shows the variable length connector 100 partially, threadably connected TC' to the block connector 10. FIG. 9C shows the variable length connector 100 fully sealed and threadably connected TC'' to the threaded block connector of FIG. 9A. In another embodiment (not shown), connection sub or union 14 may also have an internally threaded section (not shown) threadably connectable to the external thread of tubular conduits or pipes.

In yet another embodiment, e.g. as shown in FIGS. 10A-10F, the block 10 has a plurality of connection subs or unions 14 wherein the pipe connection ends 14*pc* comprises a mixture of flanged connections 14*f* and threaded connections 14*t*. For example, the embodiment of FIGS. 10A-10H has two subs 14 that have a flanged connection 14*f*, and a third sub 14 that has a threaded connection 14*t* with an externally threadable connection 14*et*. Advantageously, a block 10 with a mixture of flanged connections 14*f* and threaded connections 14*t* can be used in a retro-fit application, wherein some of the pipes P have flanged connections, and wherein other pipes P have threaded connections.

Base block member 12 (or block member) preferably comprises one or more block bores or internal passage 12*i* to conduct fracing fluids through block 10, as is conventional with traditional block connectors. When assembled, the internal passages 12*i* of the block member 12 align with the internal passages 14*i* of the subs 14 to provide a fluid communication passage for fracing fluid through the block 10 as is conventional (e.g. see FIG. 4C). Block bores 12*i* may be axially misaligned relative to each other, while still fluidly connected to each other, to facilitate angled connection of the various components (e.g. pipes P) of the fracturing fluid conduit 2; e.g. a first block bore 12*i'* in FIG. 4C has a longitudinal bore axis 12*p'* that is at a substantially 90 degree angle relative to longitudinal bore axis 12*p''* of a second block bore 12*i''*.

As is conventional, the base block member 12 is provided with bore or block ports 12*bp* to allow entry and exit of fracing fluids into and out from the block 10 via bore passages 12*p'*, 12*p''*, and to which high-pressure lines (e.g. pipes P) can be connected and through which pressurized fracturing fluids can then be pumped in a conventional manner. As is known in the art, the fracturing fluids include a slurry of treatment fluids and abrasive proppants which block connector 10 conducts to other components of the fracing system 1, such as to the fracturing fluid conduit 2.

Figure 4G:
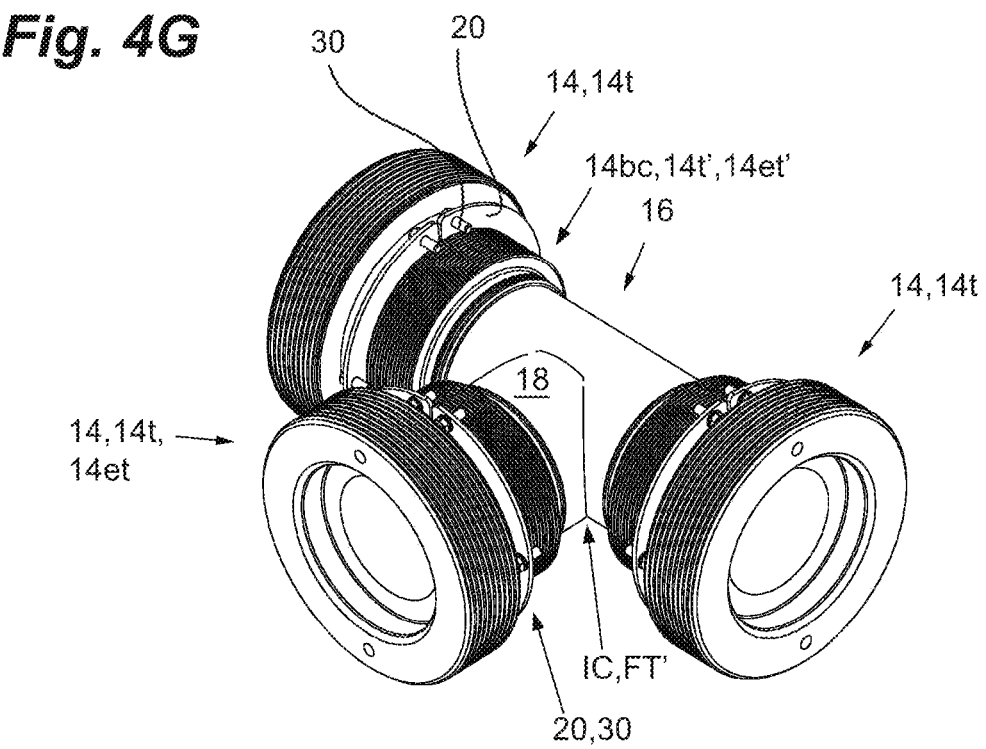
FIG. 4G-4K are top perspective views of some of the components of the threaded block connector of the embodiment of FIG. 4A.
Figure 4H:
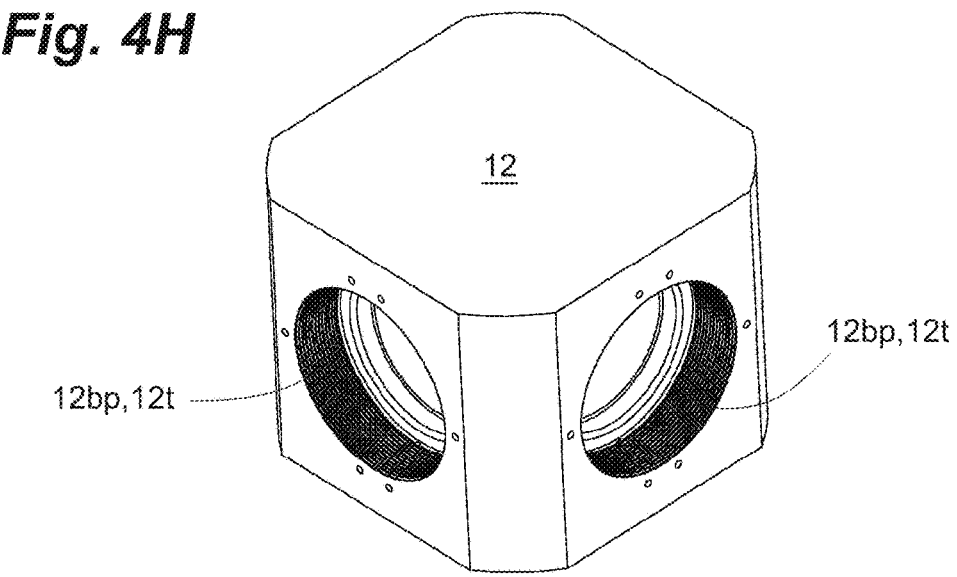
Figure 4I:
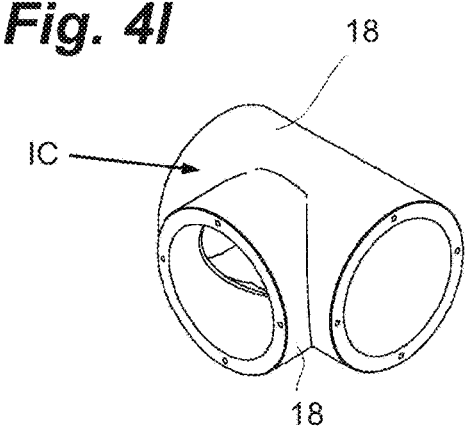

Block connection end 14*bc* of the connection sub 14 is preferably an outwardly projecting threaded end having threaded section 14*t'* (e.g. as shown in FIGS. 4F-4G). Threaded section 14*t'* is preferably an externally threadably section 14*et'* that is threadably connectable to a bore port 12*bp* having a corresponding internally treaded connection 12*t*, to make a fluid sealed, threaded connection TC between connection sub 14 and base block member 12 (see FIG. 4D).

Advantageously, connection subs 14 can be quickly and easily connected to, or disconnected from, the block member 12. More advantageously, different connection subs 14 can be quickly and easily substituted for existing connection subs 14 on a particular block 10 (e.g. a connection sub 14 having a threaded end 14*t* can be swapped out and replaced with a connection sub 14 having a flanged end 14*f*).

Preferably one or more wear-resistant inserts or sleeves 16, 18 are provided to line the interior surface of the various internal passages 12*i* of a base block member 12, said sleeves 16, 18 being of generally hollow tubular configuration, having an outside diameter of sufficient dimensions and tolerances to fit snugly inside internal passages 12*i*, and having an internal diameter of sufficient dimensions to communicate fracturing fluids through the base block member 12. The wear-resistant inserts (or "sleeves") and any associated annular sealing elements (not shown) can be secured within one or more block bores 12*i* in the block connector 10 in order to provide a wear-resistant flow-path lining that inhibits erosion of the base block member 12 and thus prolongs the service life of the block connector 10. Preferably, sleeves 16, 18 are of such dimensions that they can be inserted into internal passages 12*i* of block member 12 via one or more of the block ports 12*bp* (e.g. see FIG. 10E).

As shown in FIGS. 4C, 4D, 4E and 10D, a first insert 16 is positioned in the second block bore 12*i*", while a second insert 18 is positioned in first block bore 12*i*'. When a block 10 of the present invention is fully assembled, subs 14 abut against the sleeves 16, 18 to capture and keep them secured inside block member 12. Subs 14 also preferably provide a fluid-tight seal FT to the block bores 12*i* (e.g. via the threaded connection TC and an o-ring or other conventional seal S positioned between the sub's block connection end 14*bc* and a surface or shoulder on the internal passage 12*i*), i.e. to contain any fluid pressure within inside passages 12*i*, 14*i* and isolate such pressure from the external atmosphere. Preferably subs 14 have internal passage 14*i* wherein their internal profile matches the internal profile of the respective internal passage 16*i*, 18*i* of sleeves 16, 18 to which subs 14 abut.

Preferably, wear inserts 16, 18 are made out of durable and hardened material. More preferably, wear inserts 16, 18 have an internal surface geometry that allows for smooth fluid flow around corners. Even more preferably, wear inserts 16, 18 have mating ends 16*m*, 18*m* that mate together in an interlocking configuration IC. When sleeves 16, 18 are assembled within the block connector 10, and captured by the block connection ends 14*bc* of the subs 14, the interlocking configuration IC provides a fluid-tight seal FT' between the sleeves 16, 18 (e.g. a metal-to-metal seal; see FIG. 10D) and prevents rotation of the sleeves 16, 18 within the bores 12*i*. Since, preferably, subs 14 provide a fluid-tight seal FT to the block bores 12*i* via seal S, there is typically minimal differential pressure between the internal passages 16*i*, 18*i* of the sleeves 16, 18, and any annular space between the outside diameter of the sleeves 16, 18 and the block bores 12*i*. As such, a interlocking configuration IC where the seal is a metal-to-metal seal of the respective sleeve surfaces is sufficient to prevent frac fluid from entering such annular space.

Figure 4J:
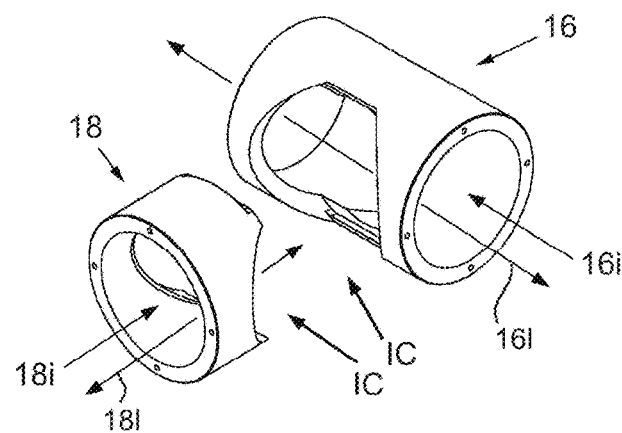
Figure 4K:
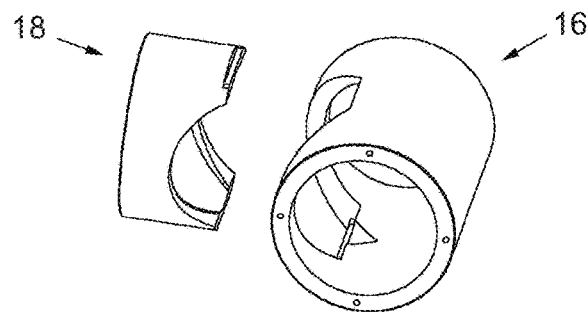
Figure 4L:
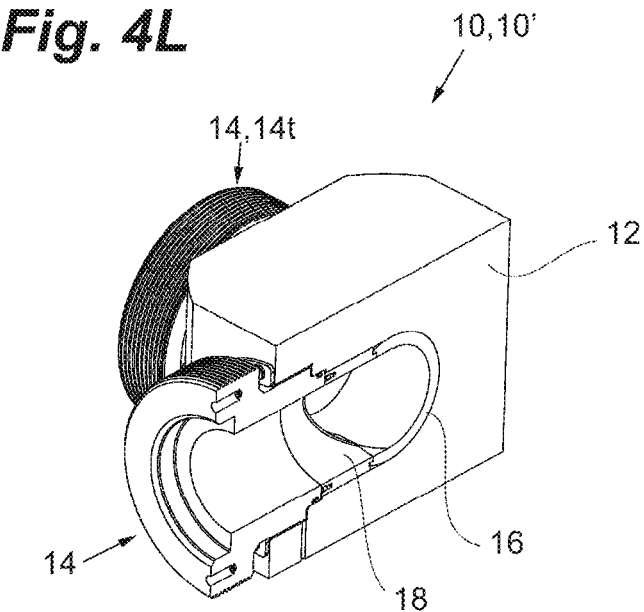
FIGS. 4L-4M are additional sectioned top perspective views of the threaded block connector of the embodiment of FIG. 4A.
Figure 4M:
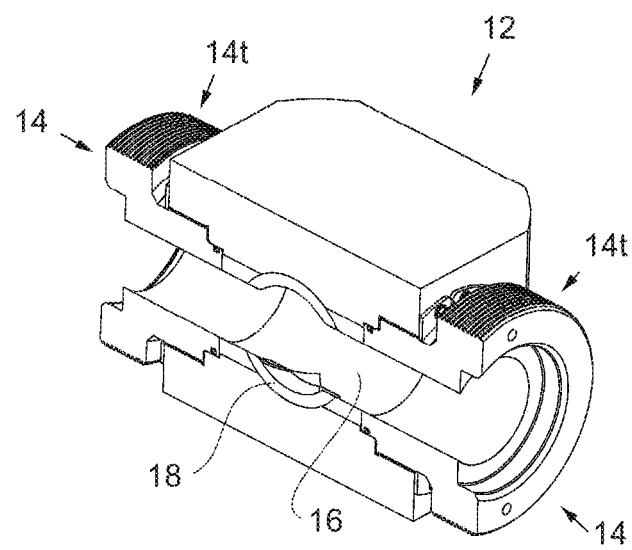
Figure 5A:
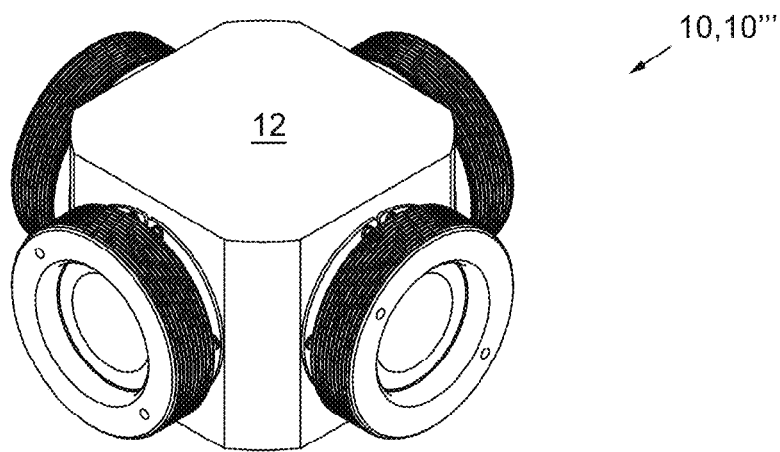
FIG. 5A is a top perspective view of another preferred embodiment of a threaded block connector.
Figure 5B:
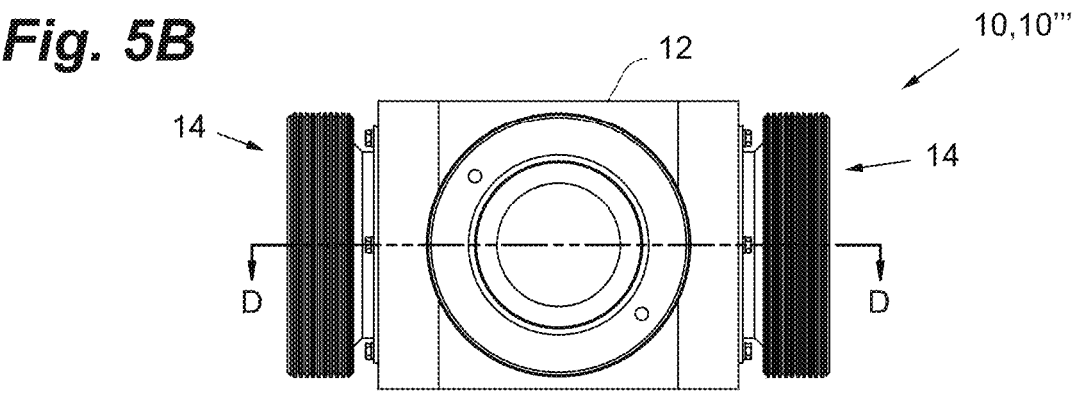
FIG. 5B is a front view of the threaded block connector of the embodiment of FIG. 5A.
Figure 5C:
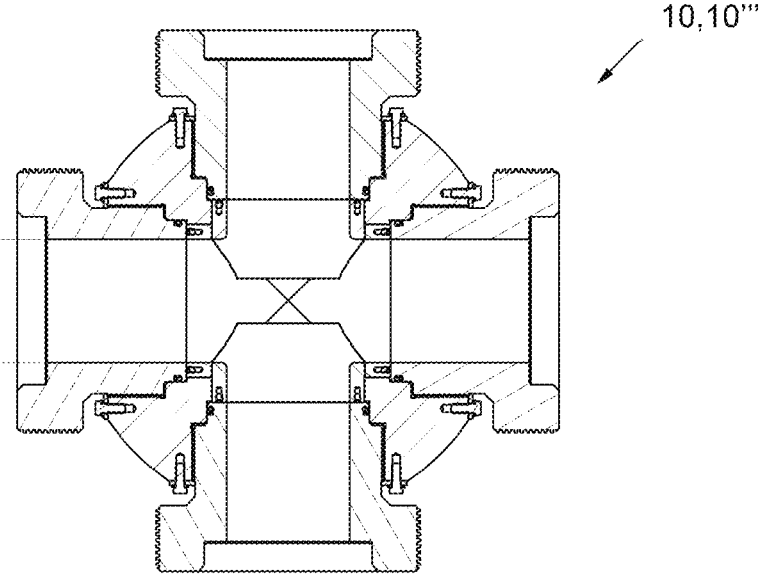
FIG. 5C is a cross-sectional view of the threaded block connector taken along the line D-D of FIG. 5B.
Figure 11A:
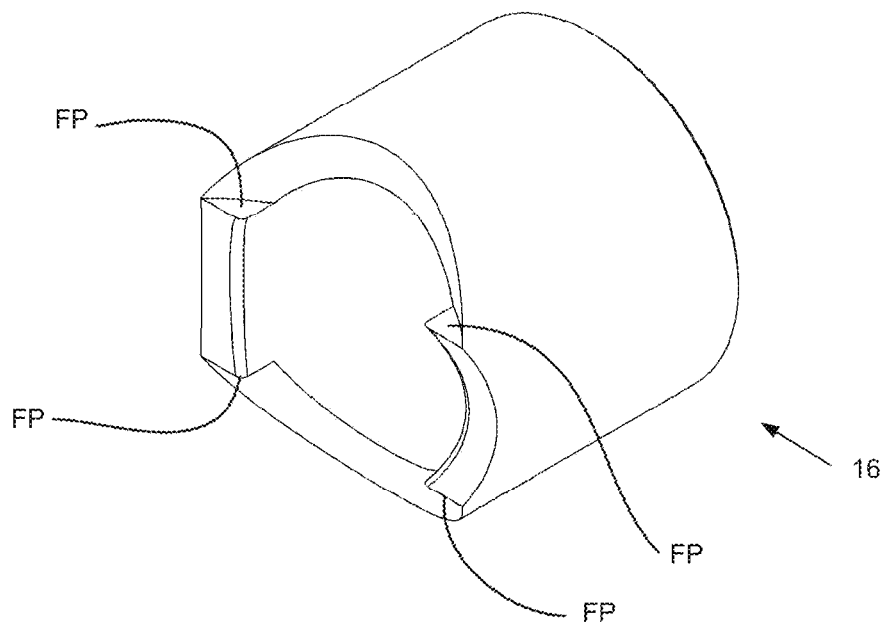
FIGS. 11A-11B are perspective views of an embodiment of wear sleeves.
Figure 11B:
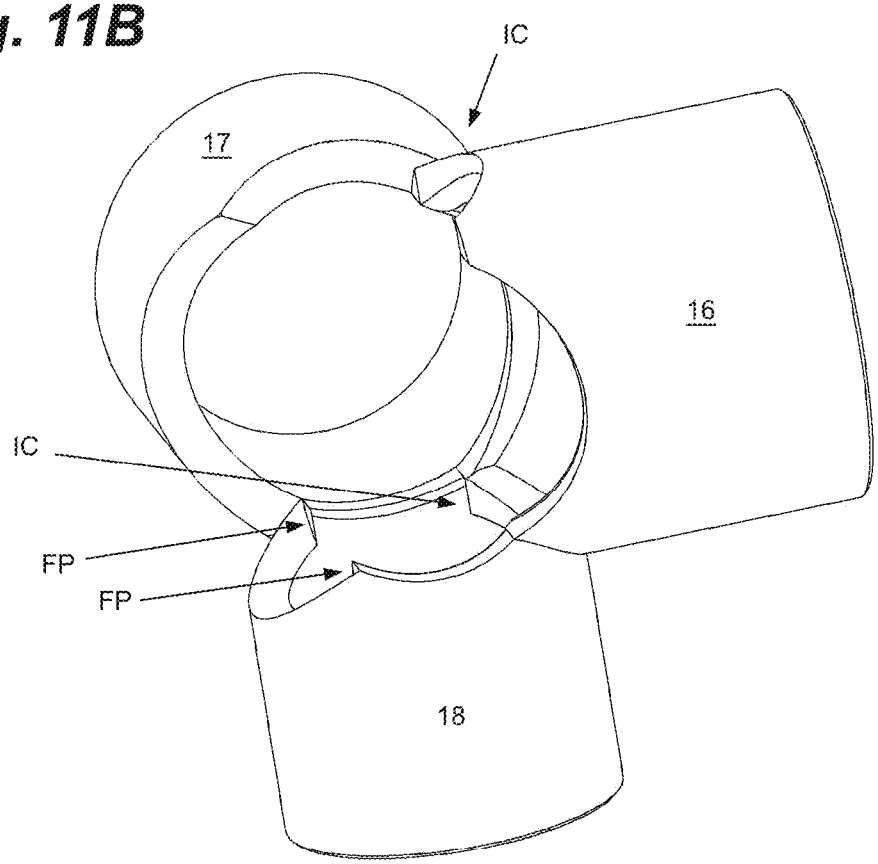
Figure 12A:
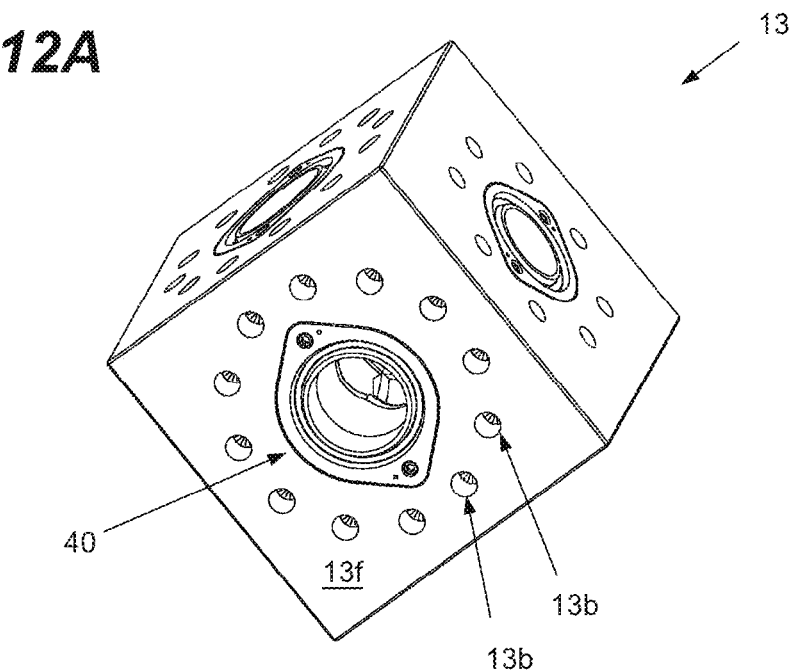
FIGS. 12A-12B are perspective views of an embodiment of a block connector.
Figure 12B:
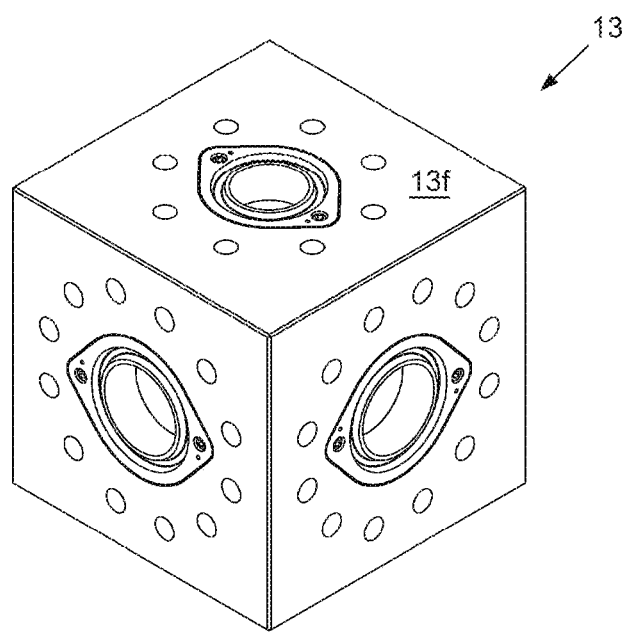
Figure 12C:
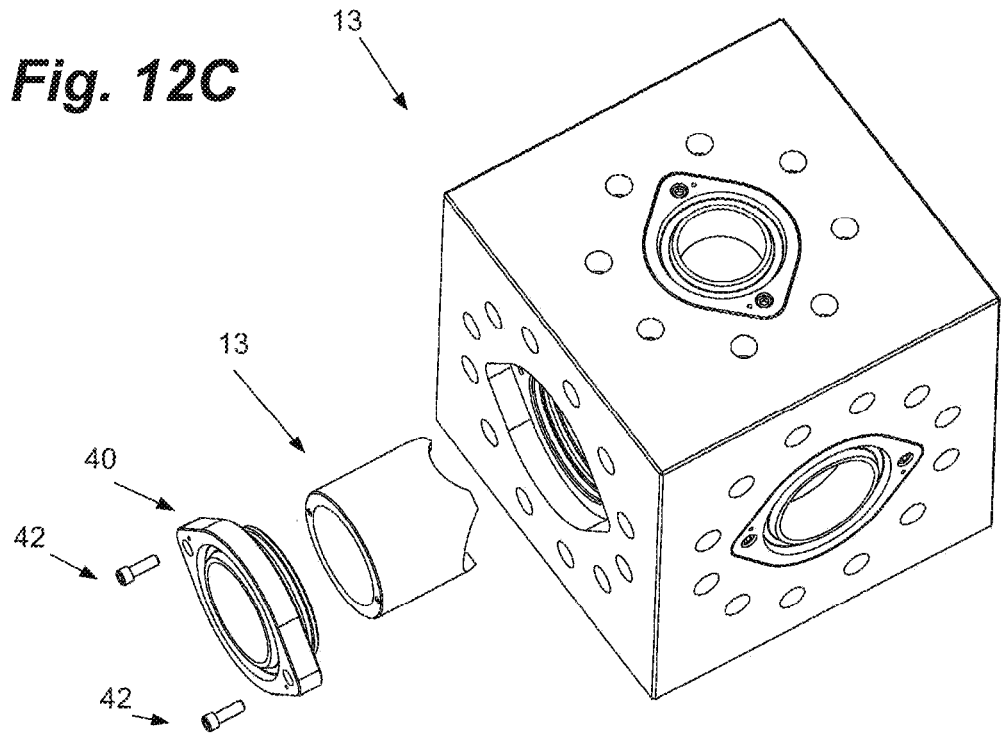
FIGS. 12C-12D are partially exploded, and partially exploded and partially sectioned, perspective views of the block connector of FIG. 12A.
Figure 12D:
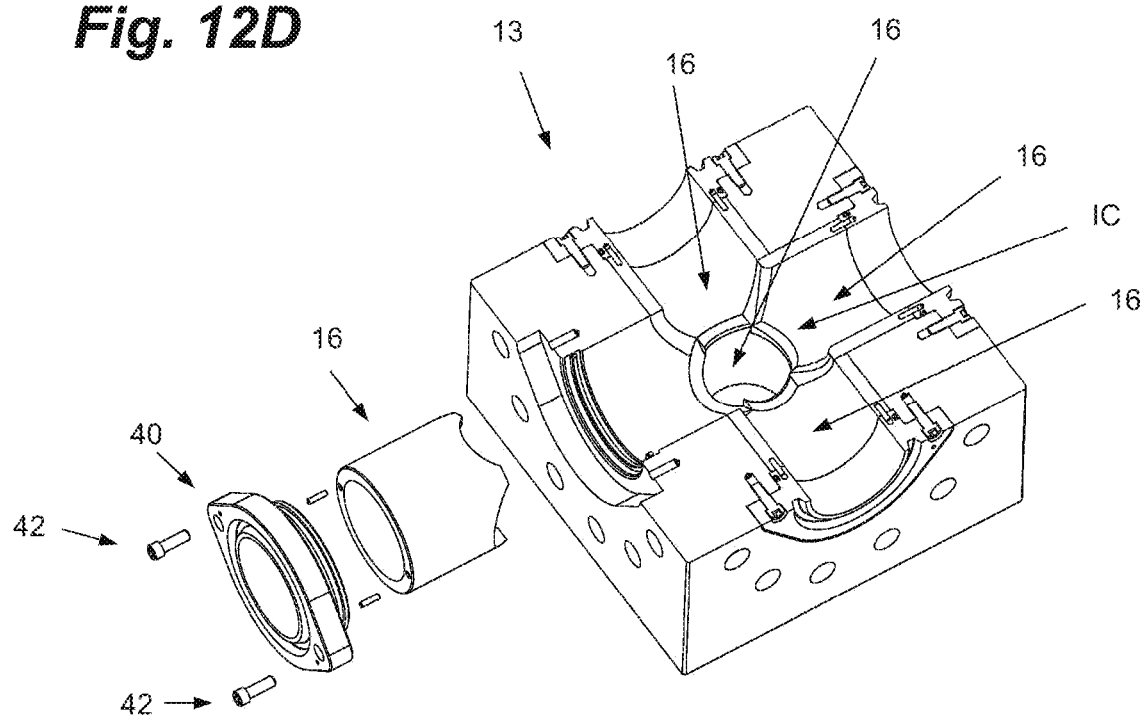
Figure 12E:
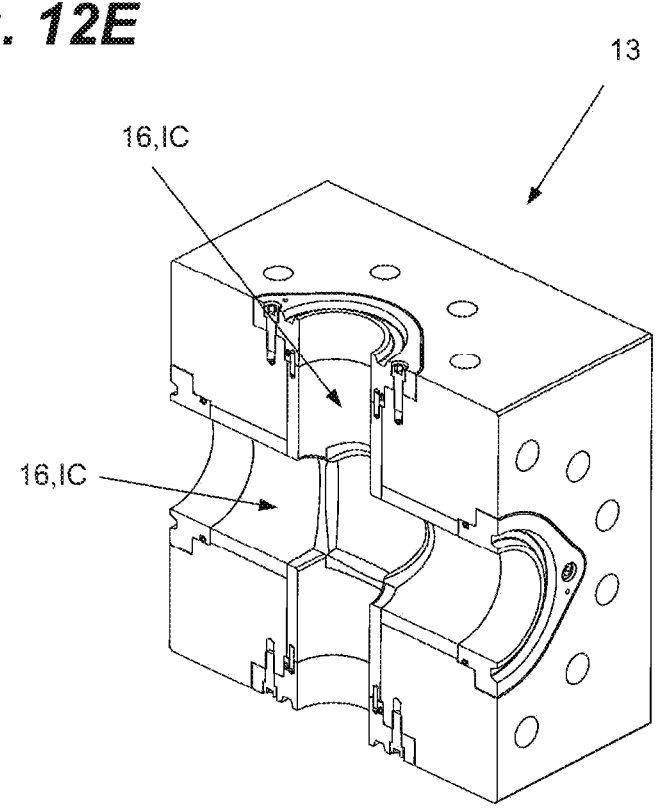
FIG. 12E is a section perspective view of the block connector of FIG. 12A.

Interlocking configuration IC may be one of a number of different geometries (including those as shown in the figures) whereby wear sleeves 16, 18 are prevented from rotating about their longitudinal axis 161, 181 (e.g. see FIG. 4J). In a preferred embodiment of an interlocking configuration IC, as shown in FIGS. 11A-11B, each of the sleeves 16, 17, 18 in that embodiment that mate together comprises a flat or planar portion FP that abuts or mates against a corresponding flat or planar portion FP of the other sleeve(s), thereby preventing rotation of the sleeves 16, 17, 18 when assembled within their respective bores 12*i* or the block member 12. If sleeves 16, 17, 18 rotate within the bores 12*i*, then the fluid-tight seal FT' between them may be compromised and/or misaligned and/or the internal flow-path of the sleeves' internal passage 16*i*, 18*i* may be compromised. This is especially of concern where a first block bore 12*i*' has a longitudinal bore axis 12*p*' that is at a substantially offset (e.g. 90 degree angle) relative to longitudinal bore axis 12*p*" of a second block bore 12*i*" (see FIG. 4C) and where the diameter of such offset sleeves 16, 18 are substantially the same (e.g. both sleeves 16, 18 have an outside diameter of 5 inches).

Advantageous, in the embodiments of the present invention any wear due to fracturing fluids is first imparted onto the interior surface of the wear inserts 16, 18. Should such wear become sufficient, connection subs 14 may be quickly and easily untreaded from the block member 12, wear inserts 16, 18 removed and replaced with new wear inserts, and then connection subs 14 rethreaded back into the block member 12 to capture the new wear inserts.

In a preferred embodiment of the block 10, sub retaining members 20 are provided to retain connection subs 14 in threaded connection with the bore ports 12*bp* once connection subs 14 are fully treaded into said block ports 12*bp*. Sub retaining members may be a planar member configured in a semi-circle shape of such diameter to be positioned around snugly around the collar 14*c* of the sub 14, and have a sufficiently small arc diameter to, once installed on block member 12, to abut against externally threaded section 14*et*' of the block connection end 14*bc*, thereby keeping sub 14 from moving relative to block member 12. Preferably a sub retaining member fastener 30 (such as screw or stud) fastens sub retaining member 20 to the block member 12 (e.g. into a treaded recess 12*tr* in block member 12). See FIGS. 10G-10H. Advantageously, when fully assembled the sub retaining member 20, and sub retaining member fasteners 30, keep subs 14 from untreading out of block member 12.

Another embodiment of a block connecter 13 having interlocking wear inserts 16 is shown in FIGS. 12A-12E. This embodiment of block 13 is a six-way block, having six block bores or passages 13*i* lined each with a wear insert 16 as shown. Instead of having a sub 14 with either a threaded or flanged end, this block 13 features a planar face 13*f* with treaded bores 13*b* to create a conventional studded connection. Sleeve retaining members 40 are provided at each of the relevant bore ports 13*bp* to: (i) retain sleeves 16 within their respective bore passage 13*i* (as shown), and (ii) provide a conventional sealing profile 40*sp* to accept a sealing member (not shown) and sealable mate with a flanged connection of a pipe or other member from the fluid conduit 2. Preferably conventional retaining member fasteners 42 (e.g. studs threadable in to corresponding threaded bores) may be provided to prevent sleeve retaining members 40 from disengaging from block 13 (e.g. prior to block 13 connecting with a flanged connection). When fully assembled, and as shown, sleeves 16 mate together to create an interlocking configuration IC in a similar manner as the other embodiments of block 10 noted above.

Exemplary materials used in the construction of the disclosed embodiments include high strength alloy steels, high strength polymers, and various grades of elastomers, seals and o-rings. Those skilled in the art will understand that, when the various threaded connections are fully connected, they form a fluid-tight sealed connection between the components suitable to withstand the typical pressures and temperatures encountered in a hydraulic fracturing operation.

Those of ordinary skill in the art will appreciate that various modifications to the invention as described herein will be possible without falling outside the scope of the invention. In the claims, the word "comprising" is used in its inclusive sense and does not exclude other elements being present. The indefinite article "a" before a claim feature does not exclude more than one of the features being present.

The embodiments of the invention in which an exclusive property or privilege is being claimed are defined as follows:

1. A block connector (10) comprising:
   a block member (12) having a plurality of block ports (12*bp*) and at least one block bore (12*i*);

a plurality of wear sleeves (16) positionable within said at least one block bore (12*i*);

wherein said wear sleeves (16) are secured within said at least one block bore (12*i*);

wherein the wear sleeves (16) further comprise mating ends that mate together in an interlocking configuration (IC) to provide a fluid-tight seal (FT') between said wear sleeves (16);

wherein the interlocking configuration (IC) prevents rotation of said wear sleeves (16) within said at least one block bore (12*i*);

wherein each of the plurality of wear sleeves (16) further comprise a planar portion (FP);

wherein said planar portion of one wear sleeve (16) is configured to mate with at least one corresponding planar portion (FP) of another wear sleeve to comprise the interlocking configuration (IC).

2. The block connector (10) of claim 1 wherein the wear sleeves (16) are secured within the at least one block bore (12*i*) by a connection sub (14).

3. The block connector (10) of claim 1 wherein the wear sleeves (16) are secured within the block bore (12*i*) by a sleeve retaining member (40).

4. A block connector (10) comprising:

a block member (12) having a plurality of block ports (12*bp*) and at least one block bore (12*i*);

a plurality of wear sleeves (16) positionable within said at least one block bore (12*i*);

wherein said wear sleeves (16) are secured within said at least one block bore (12*i*);

wherein the wear sleeves (16) further comprise mating end that mate together in an interlocking configuration (IC) to prevent rotation of said wear sleeves (16) within said at least one block bore (12*i*); and wherein each of the plurality of wear sleeves (16) further comprise a planar portion (FP);

wherein said planar portion of one wear sleeve (16) is configured to mate with at least one corresponding planar portion (FP) of another wear sleeve to comprise the interlocking configuration (IC).

\* \* \* \* \*